United States Patent Office 3,429,887
Patented Feb. 25, 1969

3,429,887
1,7-NAPHTHYRIDINE-3-CARBOXYLIC ACID DERIVATIVES AND THEIR PREPARATION
George Y. Lesher, Schodack, N.Y., assignor to Sterling Drug Inc., New York, N.Y., a corporation of Delaware
No Drawing. Continuation-in-part of application Ser. No. 255,210, June 31, 1963. This application Jan. 26, 1965, Ser. No. 428,244
U.S. Cl. 260—294.9      37 Claims
Int. Cl. C07d 39/10; A61k 27/00

ABSTRACT OF THE DISCLOSURE 1-(lower-alkyl)-3-Z-1,4-dihydro - 4 - oxo - 1,7 - naphthyridines where Z is carboxy or groups convertible thereto by hydrolysis, having antibacterial properties, are prepared by 1-alkylating corresponding 3-Z-1,4-dihydro-4-hydroxy-1,7-naphthyridines. Other aspects include: 7-alkyl-1,7-naphthyridinium quaternary salts; a rearrangement conversion of said salts bearing an 8-alkyl substituent under alkaline conditions to yield 8-hydroxyquinolines; acylation of 8-alkyl-1,7-naphthyridines to form 8-acyloxy(and diacyloxy)methyl - 1,7 - naphthyridines; and, intermediate 4-hydroxy-1,7-naphthyridine-3-carboxylic acid derivatives bearing lower-alkyl substituents at the 8- and/or 6-positions of the 1,7-naphthyridine ring.

---

This invention relates to 1,7-naphthyridine derivatives and to processes for their preparation and utilization.

This application is a continuation-in-part of the co-pending application Ser. No. 255,210, filed Jan. 31, 1963, and now abandoned.

The invention sought to be patented, in one composition aspect, resides in the class of compounds which I designate 1-(lower-alkyl)-3-Z-1,4-dihydro - 4 - oxo - 1,7-naphthyridines where Z stands for carboxy or a group convertible to carboxy by hydrolysis. Accordingly, I depict these compounds as having lower-alkyl attached to the 1-nitrogen atom of 3-Z-1,4-dihydro-4-oxo-1,7-naphthyridines where Z is defined as above. The tangible embodiments of this composition aspect of the invention possess the inherent applied use characteristics of having antibacterial properties, as determined by standard bacteriological evaluation procedures. Also, they are useful as intermediates, as shown hereinbelow.

Without limiting the generality of the foregoing, illustrative and preferred embodiments of the 3-Z-1,4-dihydro-4-oxo-1,7-naphthyridines are those of Formula I

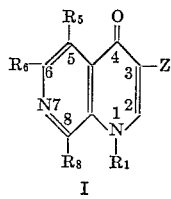

I where Z is carboxy, lower-carbalkoxy, carbamyl or cyano; $R_1$ is lower-alkyl; $R_5$ is hydrogen or lower-alkyl; $R_6$ is hydrogen, lower-alkyl, lower-alkoxy, hydroxy, amino or lower-alkanoylamino; and, $R_8$ is hydrogen, lower-alkyl, lower-alkoxy, hydroxy, amino, lower-alkanoylamino, lower-alkanoyl, hydroxymethyl, lower-alkanoyloxymethyl or di-(lower-alkanoyloxy)methyl. Also encompassed by this aspect of the invention are corresponding 5,6,7,8-tetrahydro derivatives thereof, optionally substituted at the 7-position by lower-alkyl, lower-alkenyl or benzyl as described hereinbelow.

Each of the terms "lower-alkyl," "lower-alkoxy" and "lower-alkanoyl," as used throughout this specification, e.g., as used in the definitions for $R_5$, $R_6$ or $R_8$ in Formula I, means alkyl, alkoxy or alkanoyl radicals having from one to six carbon atoms which can be arranged as straight or branched chains, among which are, for purposes of illustration but without limiting the generality of the foregoing, methyl, ethyl, n-propyl, isopropyl, 2-butyl and n-hexyl for lower-alkyl; by methoxy, ethoxy, n-propoxy, isopropoxy, isobutoxy, n-amoxy and n-hexoxy for lower-alkoxy; and, by formyl, acetyl, propionyl (n-propanoyl), isobutyryl (2-methyl-n-propanoyl) and caproyl (n-hexanoyl) for lower-alkanoyl.

The term "lower-carbalkoxy," as used throughout this specification, e.g., as one of the meanings for Z in Formula I, means carbalkoxy radicals where the alkoxy portion can be straight- or branch-chained and has from one to six carbon atoms, as illustrated by carbomethoxy, carbethoxy, carbo-n-propoxy, carbisopropoxy, carbo-n-butoxy and carbo-n-hexoxy.

The term "lower-alkenyl," as used throughout this specification, means alkenyl radicals having preferably from three to six carbon atoms, as illustrated by 2-propenyl (allyl), 2-methyl-2-propenyl, 2-butenyl, 3-butenyl and 2-hexenyl.

The invention in one process aspect, is described as residing in the process of reacting a 3-Z-4-hydroxy-1,7-naphthyridine where Z is defined as above, and is preferably lower-carbalkoxy, with a lower-alkyl ester of a strong acid, i.e., an acid which is practically completely dissociated in aqueous solution, to prepare a 1-(lower-alkyl)-3-Z-4-oxo-1,7-naphthyridine, illustrated above by Formula I. Illustrative and preferred esters are lower-alkyl esters of a strong inorganic acid or an organic sulfonic acid, said ester having the formula $R_1$-An, where An is an anion of a strong inorganic acid or an organic sulfonic acid, e.g., chloride, bromide, iodide, sulfate, methanesulfonate, benzenesulfonate, and para-toluenesulfonate. $R_1$ has the meaning given above for Formula I. The chloride, bromide or iodide is preferred because of the ready availability of the requisite lower-alkyl halides; and the reaction is carried out in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium alkoxides, potassium alkoxides, sodium amide, and the like. The purpose of the acid-acceptor is to take up the hydrogen halide (or HAn) which is split out during the course of the reaction. The reaction can be carried out in either the presence or absence of a suitable solvent, but preferably in a solvent such as a lower-alkanol, acetone, dioxane, dimethylformamide, dimethyl sulfoxide, or a mixture of solvents, e.g., a mixture of water and a lower-alkanol. The reaction is generally carried out at a temperature between about room temperature (about 25° C.) and 150° C., preferably heating on a steam bath in a stirred mixture of dimethylformamide and anhydrous potassium carbonate.

To illustrate the preparation of the preferred 1-(lower-alkyl)-3-Z-1,4-dihydro-4-oxo-1,7-naphthyridines of the invention having Formula I, the process comprises reacting the corresponding 3-Z-4-hydroxy-1,7-naphthyridine having the Formula II

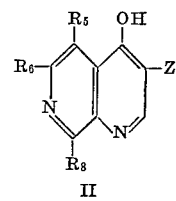

II where $R_5$ is hydrogen or lower-alkyl, $R_6$ is hydrogen, lower-alkyl, lower-alkoxy or lower-alkanoylamino, $R_8$ is hydrogen, lower-alkyl, lower-alkoxy, lower-alkanoylamino, lower-alkanoyl, lower-alkanoyloxymethyl or di-(lower-alkanoyloxy)methyl, and Z has the meaning given above for Formula I, with an ester having the formula $R_1$—An, where $R_1$ is lower-alkyl and An is an anion of a strong inorganic acid or an organic sulfonic acid, in the presence of an acid-acceptor.

When Z is lower-carbalkoxy, i.e., when the intermediate is a lower-alkyl 4-hydroxy-1,7-naphthyridine-3-carboxylate, the reaction is conveniently carried out by heating the ester with a lower-alkyl ester, preferably halide, in a non-aqueous-solvent, e.g., dimethylformamide, in the presence of anhydrous potassium carbonate to yield the corresponding lower-alkyl 1-$R_1$-1,4-dihydro - 4 - oxo-1,7-naphthyridine-3-carboxylate. If the final product is desired in acid form, the lower-alkyl 1-alkyl-1,4-dihydro-4-oxo-1,7-naphthyridine-3-carboxylate is readily hydrolyzed by heating with aqueous potassium or sodium hydroxide solution. Alternatively, but with lower yields, the 4-hydroxy-1,7-naphthyridine-3-carboxylic acid can be 1-alkylated directly as described above. Better yields in the alkylation of the 4-hydroxy-1,7-naphthyridine-3-carboxylic acid having no 8-substituent and/or 6-substituent can be obtained by alkylating in the same manner the 7-oxide, and then reducing the resulting 3-carboxy-1,4-dihydro-4-oxo-1,7-naphthyridine-7-oxide to remove the oxygen from the 7-position.

In the above-described process for preparing the 1-(lower-alkyl)-3-Z-1,4-dihydro-4-oxo-1,7 - naphthyridines by reacting a 3-Z-4-hydroxy-1,7-naphthyridine with a lower-alkyl ester, e.g., halide, the alkylation occurs at the 1-nitrogen atom; however, I found that a competing quaternization reaction also occurs at the 7-nitrogen atom. For example, reaction of ethyl 4-hydroxy-8-methyl-1,7-naphthyridine-3-carboxylate when reacted with methyl iodide in dimethylformamide in the presence of anhydrous potassium carbonate yielded a mixture of ethyl 1,4-dihydro-1,8-dimethyl-4-oxo-1,7 - naphthyridine-3-carboxylate and 3-carbethoxy-7,8-dimethyl - 4 - hydroxy-1,7-naphthyridinium iodide. Quaternization at the 7-position is favored by the absence of an acid-acceptor and can be blocked by using the 7-oxide. Also affecting the ratio of 1-alkylation and 7-quaternization are steric factors involving the size of substituents at the 6-position and/or 8-position of the 1,7-naphthyridine ring. As presented hereinbelow, the 7-alkylated-4-hydroxy-1,7-naphthyridinium salts bearing an 8-(lower-alkyl) substituent, as well as their hydroxide inner salts, are useful in the preparation of 4,8-dihydroxyquinolines.

Some of the intermediate 4-hydroxy-1,7-naphthyridine-3-carboxylic acids and derivatives are known, e.g., 4-hydroxy-1,7-naphthyridine-3-carboxylic acid, its ethyl ester and the 7-oxide of the ethyl ester. Other such intermediates, where novel, are prepared by known methods which are illustrated in the examples or by novel methods which are described further hereinbelow and illustrated in the examples. For example, the intermediate lower-alkyl 4-hydroxy-1,7-naphthyridine - 3 - carboxylate where $R_8$ (in Formula II) is other than hydrogen is obtained in two steps by first reacting a 3-amino-2-$R_8$-5-$R_5$-6-$R_6$-pyridine with one molar equivalent of a dialkyl ethoxymethylenemalonate, preferably the diethyl ester, to yield a dialkyl N-(2-$R_8$-5-$R_5$-6-$R_6$-3-pyridylamino)methylenemalonate and then cyclizing this compound by heating it in an appropriate solvent, e.g., diethyl phthalate, Dowtherm A (eutectic mixture of diphenyl and diphenyl ether), or mineral oil, to obtain the intermediate lower-alkyl 4-hydroxy-5-$R_5$-6-$R_6$-8-$R_8$-1,7-naphthyridine-3-carboxylate.

Another composition aspect of the invention sought to be patented is described as residing in the class of compounds which I designate lower-alkyl 6,8-di-(lower-alkyl)-4-hydroxy-1,7-naphthyridine-3-carboxylates. Accordingly, I depict these compounds as having lower-alkyl attached to each of the 6- and 8-positions of a lower-alkyl 4-hydroxy-1,7-naphthyridine-3-carboxylate, e.g., ethyl 6,8 - dimethyl - 4 - hydroxy - 1,7 - naphthyridine-3-carboxylate and ethyl 6-ethyl-4-hydroxy-8-methyl-1,7-naphthyridine-3-carboxylate. These embodiments of the invention have been tested by standard anti-viral evaluation procedures and found to have activity against influenza in mice. For example, these compounds were found to have in vivo activity against influenza in mice when administered orally or subcutaneously at dose levels of about 50 to 200 mg./kg./day; as illustrative, ethyl 6,8-dimethyl - 4 - hydroxy - 1,7 - naphthyridine - 3 - carboxylate and ethyl 6-ethyl-4-hydroxy-8-methyl-1,7-naphthyridine-3-carboxylate each inhibited lung weight increase in mice infected with the $PR_8$ strain of influenza virus, the former when administered subcutaneously at 100 mg./kg./day and orally at 200 mg./kg./day, and the latter when administered subcutaneously at 100 mg./kg./day and orally at 50 mg./kg./day. As shown hereinbelow, these particular embodiments have the further utility as intermediates in the preparation of 3-carboxy-4-hydroxy-6,7,8-tri-(lower-alkyl)-1,7-naphthyridinium salts which, in turn, can be converted to 4,8-dihydroxy-6-(lower-alkyl)-quinoline-3-carboxylic acids; also, these compounds in the form of their 7-oxides have the further utility of serving as intermediates in the preparation of corresponding 8-(lower-alkanoyloxymethyl)-1,7-naphthyridines.

The 3-Z-4-hydroxy-1,7-naphthyridines, in contrast to their inner salts (vide infra, Formula III), exist in tautomeric forms. Illustrating this tautomerism in the case of Formula II,

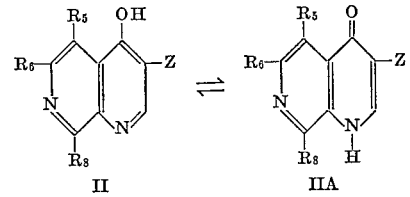

As with all tautomeric systems, the rate of transformation II⇌IIA, and the ratio II/IIA, are dependent on the thermodynamic environment, including the state of aggregation; so that measurements by any particular technique do not necessarily have validity except under the conditions of the measurement, thereby, among other consequences, giving rise to problems for any simple designation of the physical embodiments. Thus, measurements of the infrared spectra, in potassium bromide admixture, or in chloroform or mineral oil, indicate existence predominantly as IIA, but nevertheless I have preferred to use the names based on structure II, although it is understood that either or both structures are comprehended.

Another composition aspect of the invention sought to be patented is described as residing in the class of compounds which I have designated lower-alkyl 8-(lower-alkyl) - 4 - hydroxy - 1,7 - naphthyridine - 3 - carboxylates. Accordingly, I depict these compounds as having lower-alkyl attached to the 8-position of a lower-alkyl 4-hydroxy-1,7-naphthyridine-3-carboxylate, e.g., ethyl 4-hydroxy-8-methyl-1,7-naphthyridine-3-carboxylate and methyl 8 - ethyl - 4 - hydroxy - 1,7 - naphthyridine - 3 - carboxylate. Unlike a corresponding prior art compound having no 8-alkyl substituent and like the above-described lower-alkyl 6,8-di-(lower-alkyl)-4-hydroxy-1,7-naphthyridine - 3 - carboxylates, these 4 - hydroxy - 1,7-naphthyridine-3-carboxylic acid esters bearing an 8-(lower-alkyl) substituent are useful in the preparation of valuable 3 - carboxy - 7,8 - di - (lower - alkyl) - 4-hydroxy-1,7-naphthyridinium salts which can be converted to 4,8-dihydroxyquinoline-3-carboxylic acids, as described hereinbelow; and, further, are useful in the form of their 7-oxides as intermediates in the hereinbelow-described reaction with a lower-alkanoic anhydride to form the corresponding lower-alkyl 4-hydroxyl-8-(lower-alkanoyloxymethyl) - 1,7 - naphthyridine - 3 - carboxylates.

The intermediate lower-alkyl 4-hydroxy-1,7-naphthyridine-3-carboxylates where $R_8$ (in Formula II) is hydrogen are obtained by reaction a 3-amino-5-$R_5$-6-$R_6$-pyridine with dialkyl ethoxymethylenemalonate, preferably the diethyl ester, to yield a dialkyl N-(5-$R_5$-6-$R_6$-3-pyridyl)aminomethylenemalonate; preparing its 1-oxide; and then cyclizing the 1-oxide as above to obtain the 3-carbalkoxy - 4 - hydroxy - 5-$R_5$ - 6 - $R_6$ - 1,7 - naphthyridine-7-oxide, which is then preferably alkylated to obtain the 1 - $R_1$ - 3 - carbalkoxy - 1,4 - dihydro - 4 - oxo - 5-$R_5$-6-$R_6$-1,7-naphthyridine-7-oxide followed by reduction to remove the 7-oxygen atom. Alternatively, but with lower yields, the 3-carbalkoxy-4-hydroxy-5,$R_5$-6-$R_6$-1,7-naphthyridine-7-oxide can be reduced first to remove the 7-oxygen atom and then alkylated.

Also within the scope of the invention are 3-carboxylic acid salts of our above-described 1-(lower-alkyl)-1,4-dihydro-4-oxo-1,7-naphthyridine-3-carboxylic acids. Preferred types of salts are those having cations which do not increase the toxicity of the compound as a whole toward animal organisms. These comprise the alkali metal salts, e.g., the sodium or potassium salts; the lower-alkaline earth metal salts, e.g., magnesium or calcium salts; and, the ammonium or organic amine salts, e.g., diethanolamine or N-methyl-glucamine salts. Although medicinally acceptable salts are preferred, other and all cationic salts are within the scope of our invention. All such salts, including those having toxic cations, are useful in characterizing the free acids and as intermediates in purification of the free acids. The salts are prepared from the acids using methods illustrated hereinbelow in the examples.

Also encompassed by the invention are quaternary-ammonium salts of the aforesaid 1-alkyl-3-Z-1,4-dihydro-4-oxo-1,7-naphthyridines, quaternization occurring at the 7-ring-nitrogen. These salts are useful for further identification of the aforesaid compounds and, also, where bearing an 8-(lower-alkyl) substituent, as intermediates for the preparation of 8-hydroxy-4-oxoquinolines described hereinbelow. The quaternary ammonium salts are obtained by the addition of esters having a molecular weight less than about 200 to the free base form of the compounds. A preferred class of esters comprises lower-alkyl, lower-alkenyl or benzyl esters of inorganic acids or organic sulfonic acids of the formula $R_7$—An where $R_7$ is lower-alkyl, lower-alkenyl or benzyl and An is defined above. $R_7$ when benzyl can bear any number and kind of inert substituents in the benzene ring, such substituents being illustrated by, but not limited to, lower-alkyl, lower-alkoxy, halo, nitro, lower-alkylamino, lower-alkylmercapto, and the like. $R_7$—An is thus illustrated by, but not limited to, methyl chloride, methyl bromide, methyl iodide, ethyl bromide, propyl chloride, isobutyl bromide, allyl chloride, allyl bromide, methyl sulfate, methyl methane-sulfonate, methyl benzenesulfonate, methyl p-toluene-sulfonate, benzyl chloride, benzyl bromide, p-chlorobenzyl chloride, p-nitro-benzyl chloride, o-chlorobenzyl chloride, 3,4-dichlorobenzyl chloride, p-methoxybenzyl chloride, and the like. The quaternary ammonium salts are prepared by mixing the free base and the alkyl, alkenyl or benzyl esters in an organic solvent inert under the conditions of reaction, for example, ethanol, methanol, ether, acetonitrile, dimethylformamide, dimethyl sulfoxide, and the like or, alternatively, in the absence of a solvent. Heating is preferably used to facilitate the reaction, although quaternary formation takes place at room temperature but a longer reaction time is needed. The quaternary ammonium salt separates directly or can be obtained by concentration of the solution.

Although the lower-alkyl ester embodiments of the 1-(lower-alkyl)-1,4-dihydro - 4 - oxo - 1,7 - naphthyridine-3-carboxylic acids are preferred, all esters are within the scope of the invention. Sub-classes of esters of practical importance are, for instance, esters derived from alkanols having up to and including eighteen carbon atoms, phenols having up to and including ten carbon atoms, (lower-tertiary-amino) - (polycarbon-lower-alkanols) and (lower-secondary - amino) - (polycarbon-lower-alkanols) ["lower - tertiary - amino" especially meaning di - (lower-alkyl)amino, as well as piperidino, morpholino, pyrrolidino, piperazino and lower-alkylated derivatives thereof; "lower-secondary-amino" especially meaning mono-lower-alkyl-amino; and, "polycarbon-lower-alkanols" having from two to six carbon atoms and having the connecting linkages to the hydroxyl group and to the amino group on different carbon atoms]; and, also, the corresponding thiol esters prepared from the corresponding alkylmercaptans, substituted-alkylmercaptans and thiophenols. Although medicinally acceptable esters are preferred, other and all esters are encompassed by the scope of the invention; all esters are useful in characterizing the free acids and/or as intermediates in purification of the free acids; all can be hydrolyzed to the 3-carboxylic acids.

Similarly, like the salts and esters, all amide and hydrazide derivatives are within the scope of the invention, and they have the same utilities as the salts and esters. Preferred amide and hydrazide embodiments are those derived from ammonia or hydrazine, unsubstituted or substituted by one or more low-molecular substituents, e.g., lower-alkyl, lower-hydroxyalkyl, (i.e., —Y—OH, Y defined below) lower-carboxyalkyl (i.e., —Y—COOH), lower-carbalkoxyalkyl [i.e., —Y—COO-(lower-alkyl)], (lower tertiary-amino)-(polycarbon-lower-alkyl), phenyl, and the like. Here and elsewhere throughout this specification, it will be understood the benzene ring of phenyl can bear any number and kind of substituents such as would occur to the man skilled in organic chemistry. Solely for illustration, and without limitation, such substituents include lower-alkyl, lower-alkoxy, halo (chloro, bromo, iodo or fluoro), nitro, lower- alkyl-mercapto, and the like.

In its general aspect, the invention encompasses not only the aforementioned 1-(lower-alkyl) - 3 - Z - 1,4-dihydro-4-oxo-1,7-naphthyridines where Z stands for carboxy and salt, ester, amide and hydrazine derivatives thereof but also for corresponding compounds where Z stands for other groups convertible to carboxy by hydrolysis, e.g., where Z stands for C(=NH)O—(lower-alkyl), C(=NH)NH$_2$, C(=NH)NH—(lower-alkyl)

C(=S)OH [or C(=O)SH] and C(=O)—halide [chloride or bromide preferred, but iodide and fluoride also comprehended].

The lower-alkyl esters of the 1,4-dihydro-4-oxo-1-(lower-alkyl)-1,7-naphthyridine-3-carboxylic acids, especially the methyl and ethyl esters, react with hydrazines and ammonia or amines to form the corresponding hydrazides and amides, respectively. Also, they can be reacted with higher homologous alkanols, e.g., n-butanol, 1,3-dimethylhexanol, n-decanol, or with an amino-alcohol, e.g., 3-(1-piperidyl)propanol or 4-dimethylaminobutanol, by an ester exchange reaction to yield the corresponding higher alkyl or aminoalkyl ester, e.g., n-butyl, 1,3-dimethylhexyl, n-decyl, 3-(1-piperidyl)propyl or 4-dimethylaminobutyl ester, respectively.

In summary, with regard to the 3-substituent of the 1-(lower-alkyl)-3-Z-1,4-dihydro-4-oxo-1,7-naphthyridines, it can be carboxy and salts thereof or any other group convertible to carboxy by hydrolysis, i.e., for illustrative purposes, where Z is CN; COO—(alkyl) where alkyl has from one to eighteen carbon atoms inclusive; COO—Y—NB where Y, as used here and elsewhere in this specification, is alkylene having from two to six carbon atoms which can be arranged as straight or branched chains and having its two connecting linkages on different carbon atoms, and NB is lower-alkylamino, di-(lower-alkyl)amino, as well as piperidino, pyrrolidino, morpholino or piperazino and lower-alkylated derivatives of these ring systems; CONH—Y—NB where Y and NB are defined as above; COO—phenyl; COS—(lower-alkyl); COS—phenyl; C(=O)—halide; C(=S)OH;

C(=NH)O—(lower-alkyl); C(=NH)NH$_2$; C(=NH)—NH(lower-alkyl); CONR'R'' where R' is hydrogen or lower-alkyl and R'' is hydrogen, lower-alkyl, phenyl, Y—NB as defined as above, Y—OH, Y—COOH and Y—COO—(lower-alkyl); and, CON(R''')NR'R'' where R' and R'' are defined as above, and R''' is hydrogen, lower-alkyl or phenyl.

Also encompassed by the invention are the corresponding 7-oxides of the compounds of Formula I. These compounds can be prepared either by 1-alkylating the 7-oxide of the 4-hydroxy-3-Z-1,7-naphthyridine of Formula II by the procedure described above for 1-alkylating the 4-hydroxy-3-Z-1,7-naphthyridine or by reacting the compound of Formula I with an oxidizing agent effective to oxidize aromatic ring-nitrogen compounds to their N-oxides, e.g., peracetic acid in acetic acid as a solvent or 3-chloroperbenzoic acid in chloroform as a solvent.

Some of the 1-R$_1$-1,4-dihydro-4-oxo-1,7-naphthyridine-3-carboxylic acids and derivatives have further utility as intermediates in the preparation of other of the 1-R$_1$-3-Z-1,4-dihydro-4-oxo-1,7-naphthyridines, as illustrated below for the preparation of preferred 6-and/or 8-substituted-naphthyridine embodiments.

For example, the 6-amino,1,4-dihydro-4-oxo-1-R$_1$-8-R$_8$-1,7-naphthyridine-3-carboxylic acids and derivatives of Formula I (where R$_6$ is NH$_2$) are conveniently converted into the corresponding 6-diazonium salts which are in turn converted into other 6-substituted-1,4-dihydro-4-oxo-1-R$_1$-8-R$_8$-1,7-naphthyridine-3-carboxylic acids and derivatives, e.g., the corresponding 6-hydroxy compounds. The 6-amino-1,4-dihydro-4-oxo-1-R$_1$-8-R$_8$-1,7-naphthyridine-3-carboxylic acids are prepared by reacting a lower-alkyl 6-(lower-alkanoylamino) 4-hydroxy-8-R$_8$-1,7-naphthyridine-3-carboxylate, e.g., the ethyl 6-acetylamino compound, with an ester of the Formula R$_1$—An, e.g., methyl iodide, to obtain the corresponding lower-alkyl 6-acylamino-1,4-dihydro-4-oxo-1-R$_1$-8-R$_8$-1,7-naphthyridine-3-carboxylate, e.g., the ethyl 6-acetylamino-1,4-dihydro-4-oxo-1-methyl-8-R$_8$-1,7-naphthyridine-3-carboxylate, which is then hydrolyzed with an acidic agent, e.g., HCl, to remove both the ester and N-acyl groups.

Another process aspect of the invention sought to be patented is described as residing in the process of reacting the 7-oxide of an 8-methyl-1,7-naphthyridine or the 7-oxide of an 8-(lower-alkanoyloxymethyl)-1,7-naphthyridine with a lower-alkanoic anhydride to prepare, respectively, an 8-(lower-alkanoyloxymethyl)-1,7-naphthyridine or an 8-[di-(lower-alkanoyloxy)methyl]-1,7-naphthyridine. In this process, the 8-methyl group can be substituted by lower-alkyl, phenyl or phenyl (lower-alkyl). Preferred embodiments of this process aspect, for purposes of illustration but without limiting the generality of the foregoing, are the reaction of the 7-oxide of a lower-alkyl 4-hydroxy-8-methyl-1,7-naphthyridine-3-carboxylate or the 7-oxide of a lower-alkyl 1,4-dihydro-1-(lower-alkyl)-8-methyl-4-oxo-1,7-naphthyridine-3-carboxylate with a lower-alkanoic anhydride to prepare, respectively, a lower-alkyl 4-hydroxy-8-(lower-alkanoyloxymethyl)-1,7-naphthyridine-3-carboxylate or a lower-alkyl 1,4-dihydro-8-(lower-alkanoyloxymethyl)-1-(lower-alkyl)-4-oxo-1,7-naphthyridine-3-carboxylate, and the reaction of the 7-oxide of a lower-alkyl 4-hydroxy-8-(lower-alkanoyloxymethyl)-1,7-naphthyridine-3-carboxylate with a lower-alkanoic anhydride to prepare a lower-alkyl 4-hydroxy-8-[di-(lower-alkanoyloxy)methyl]-1,7-naphthyridine-3-carboxylate. This reaction is carried out preferebly by heating the appropriate 7-oxide with a lower-alkanoic anhydride, e.g., acetic anhydride, using a solvent; as solvent there can be used an excess of the anhydride or the corresponding alkanoic acid (e.g., acetic acid with acetic anhydride) or any solvent unreactive to acid anhydrides, i.e., a solvent devoid of hydroxyl, sulfhydryl, or primary or secondary amino groups; thus, other suitable solvents include, without limitation, hydrocarbons, halo-hydrocarbons, tertiary-amines, ketones, ethers, tertiary-amides, nitriles, esters, and the like, satisfying the requirement of being liquid at reaction temperatures. Such solvents per se form no part of the invention, and their nature is well understood by the organic chemist. Examples of such solvents are acetonitrile, benzene, toluene and dimethylformamide. This reaction is generally carried out at a temperature in the range of about 70° C. to 150° C., preferably on a steam bath. This process aspect of the invention and the utilization of the compounds produced thereby is further illustrated as follows: the preparation of ethyl 8-acetoxymethyl-4-hydroxy-6-methyl-1,7-naphthyridine,-3-carboxylate by heating 3-carbethoxy-6,8-dimethyl-4-hydroxy-1,7-naphthyridine-7-oxide with acetic anhydride; and, the preparation of ethyl 8-(di-acetoxymethyl)-4-hydroxy-6-methyl-1,7-naphthyridine-3-carboxylate by heating 8-acetoxymethyl-3-carbethoxy-4-hydroxy-6-methyl-1,7-naphthyridine-7-oxide with acetic anhydride. The intermediate 7-oxides in each instance are obtained by oxidation of the corresponding 3-carbethoxy-4-hydroxy-6-methyl-8-substituted-1,7-naphthyridine with a peracid, e.g., peracetic acid, perbenzoic acid, 3-chloroperbenzoic acid, and the like. The products of this process aspect of the invention are useful as intermediates in the above-described process of preparing the 1-(lower-alkyl) 4-oxo compounds. For example, the reaction of ethyl 8-acetoxymethyl-4-hydroxy-6-methyl-1,7-naphthyridine-3-carboxylate or ethyl 8-(diacetoxymethyl) 4-hydroxy-6-methyl-1,7-naphthyridine-3-carboxylate with methyl iodide in dimethylformamide in the presence of anhydrous potassium carbonate yields, respectively, ethyl 8-acetoxymethyl-1,4-dihydro-1,6-dimethyl-4-oxo-1,7-naphthyridine-3-carboxylate or ethyl 8-(diacetoxymethyl)-1,4-dihydro-1,6-dimethyl-4-oxo-1,7-naphthyridine-3-carboxylate, which, in turn, can be hydrolyzed with hydrochloric acid to yield, respectively, 1,4-dihydro-1,6-dimethyl-8-hydroxymethyl-4-oxo-1,7-naphthyridine-3-carboxylic acid or 1,4-dihydro-1,6-dimethyl-8-formyl-4-oxo-1,7-naphthyridine-3-carboxylic acid.

Another composition aspect of the invention sought to be patented is described as residing in the class of compounds which I designate 3-Z-4-hydroxy-8-R$_8$-1,7-naphthyridines where Z is carboxy or lower-carbalkoxy, and R$_8$ is a member of the group consisting of hydroxymethyl, lower-alkanoyloxymethyl, di-(lower-alkanoyloxy)methyl and formyl. Illustrations of these compounds are ethyl 8-acetoxymethyl-4-hydroxy-6-methyl-1,7-naphthyridine-3-carboxylate, ethyl 8-(diacetoxy-methyl)-4-hydroxy-6-methyl-1,7-naphthyridine-3-carboxylate, 8-formyl-4-hydroxy-6-methyl-1,7-naphthyridine-3-carboxylic acid, and 4-hydroxy-8-hydroxymethyl-6-methyl-1,7-naphthyridine-3-carboxylic acid. These compounds are prepared by the procedures described hereinabove.

Another composition aspect of the invention sought to be patented resides in the class of compounds which I designate 8-(lower-alkyl)-7-R$_7$-1,7-naphthyridinium salts, where R$_7$ is lower-alkyl or lower-alkenyl, and where the salts include both those with an external anion, An (defined hereinabove), whose nature is not critical or a part of the invention, and internal or inner salts, wherein a 4-O⁻ or 3-COO⁻ group provides the anion. These compounds are useful as intermediates in the hereinbelow-described novel process for preparing 8-hydroxyquinolines. Without limiting the generality of the foregoing, illustrative and preferred embodiments of said quaternary ammonium salts are 7,8-di-(lower-alkyl)-1,7-naphthyridinium salts, in particular, 3-carboxy-7,8-di(lower-alkyl)-

4-hydroxy-1,7-naphthyridinium salts and 3-carboxy-1,4-dihydro - 7,8 - di-(lower-alkyl)-4-oxo-1,7-naphthyridinium salts. Preferred hydroxide inner salt derivatives are 4-hydroxy-7-(lower-alkyl)-1,7-naphthyridinium hydroxide inner salts and 3-carboxy-1,4-dihydro-1,7-di(lower-alkyl)-4-oxo-1,7-naphthyridinium hydroxide inner salts, illustrative and preferred embodiments of which are those of the probable respective Formulas III and IV:

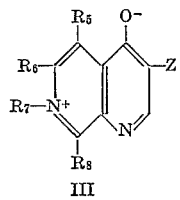 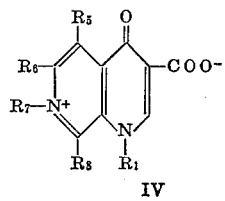

III                    IV where Z (in Formula III) is hydrogen, carboxy or cyano; $R_5$ (in Formula III) is hydrogen, hydroxy or lower-alkyl and $R_5$ (in Formula IV) is hydrogen or lower-alkyl; $R_6$ (in each of Formulas III and IV) is hydrogen or lower-alkyl; and $R_1$ (in Formula IV), and $R_7$ and $R_8$ (in each of Formulas III and IV) are each lower-alkyl.

The inner salts are prepared, as described hereinbelow in the specific exemplary disclosure, by reacting the corresponding 8 - (lower-alkyl) - 7-$R_7$-1,7-naphthyridinium salts, e.g., halides, with an acid-acceptor, preferably with an aqueous solution of an acid-acceptor, e.g., sodium hydroxide, potassium hydroxide, ammonia, potassium bicarbonate, at room temperature or, if necessary, with warming for a short period.

Another process aspect of the invention sought to be patented is described as residing in the process of preparing an 8-hydroxyquinoline by heating an 8-(lower-alkyl)-7-$R_7$-1,7-naphthyridinium salt, above defined, in an aqueous alkaline medium. Without limiting the generality of the foregoing, illustrative and preferred embodiments are: the preparation of an 8-hydroxyquinoline from a 7,8-di-(lower-alkyl)-1,7-naphthyridinium salt, in particular, a 4,8-dihydroxyquinoline from a 4-hydroxy-7,8-di-(lower-alkyl)-1,7-naphthyridinium salt or a 1,4-dihydro-8-hydroxy - 1-(lower-alkyl)-4-oxoquinoline-3-carboxylic acid from a 3-carboxy-1,4-dihydro-4-oxo-1,7,8-tri-(lower-alkyl)-1,7-naphthyridinium salt; the preparation of a 4,8-dihydroxyquinoline from a 4-hydroxy-7,8-di-(lower-alkyl)-1,7-naphthyridinum hydroxide inner salt; and, the preparation of a 1,4-dihydro-8-hydroxy-1-(lower-alkyl)-4-oxoquinoline-3-carboxylic acid from a 3-carboxy-1,4-dihydro-4-oxo-1,7,8-tri-(lower-alkyl)-1-7-naphthyridium hydroxide inner salt. These conversions to 8-hydroxyquinolines are further illustrated by the following conversions of: 7,8-dimethyl-1,7-naphthyridinium iodide to 8-hydroxyquinoline, 4-hydroxy-7,8-dimethyl-1,7-naphthyridinium iodide or hydroxide inner salt to 4,8-dihydroxyquinoline, 3-carboxy-4-hydroxy-6,7,8-trimethyl-1,7-naphthyridinium iodide or hydroxide inner salt to 4,8-dihydroxy-6-methylquinoline-3-carboxylic acid, 3-carboxy-8-ethyl-4-hydroxy-6,7-dimethyl-1,7-naphthyridinium iodide or hydroxide inner salt to 4,8-dihydroxy-6,7-dimethylquinoline-3-carboxylic acid, and 3-carboxy-1,4-dihydro-4-oxo-1,6,7,8-tetramethyl-1,7-naphthyridinum iodide or hydroxide inner salt to 1,4-dihydro-1,6-dimethyl-8-hydroxy-4-oxoquinoline-3-carboxylic acid. In each instance, the other porduct of the conversion is $R_7$—$NH_2$, i.e., a lower-alkylamine or a lower-alkenylamine, e.g., methylamine when $R_7$ is methyl or allylamine when $R_7$ is allyl. These conversions are carried out preferably by heating the 1,7-naphthyridinium salt in an aqeous alkaline medium, preferably in an aqueous solution of potassium or sodium hydroxide. The reaction is conveniently carried out by heating the alkaline reaction mixture on a steam bath or under gentle reflux for a period of time sufficient to complete the conversion. Quaternary ammonium salts of the 3-Z-4-OH type or 1-$R_1$-3-carboxy-4-oxo type are probably first converted, as noted above, to corresponding hydroxide inner salts of the probable respective Formulas III and IV. It is noted that in the above reaction when the intermediate salt bears an 8-methyl substituent the resulting 8-hydroxyquinoline is unsubstituted at its 7-position; however, when the intermediate salt bears lower-alkyl other than methyl at the 8-position, the resulting 8-hydroxyquinoline has a 7-alkyl group which has one less carbon atom than the 8-alkyl group of the intermediate salt. Thus, an 8-ethyl-1,7-naphthyridinium salt yields an 8-hydroxy-7-methylquinoline, an 8-n-propyl-1,7-naphthyridinium salt yields an 8-hydroxy-7-ethylquinoline, etc. Optionally, the 8-(lower-alkyl) substituent of the 1,7-naphthyridinium salt can bear a phenyl substituent; thus, an 8-benzyl-or 8-(2-phenylethyl) - 1,7 - naphthyridium salt yields, respectively, an 8-hydroxy-7-phenylquinoline or a 7-benzyl-8-hydroxyquinoline.

The molecular structures of the compounds of the invention were assigned on the basis of study of their infrared, ultraviolet and NMR spectra and their transformation products, and confirmed by the correspondence of calculated and found values for the elementary analyses for representative examples.

The 1,4 - dihydro-1-(lower-alkyl)-4-oxo-1,7-naphthyridine-3-carboxylic acids and derivatives when tested according to standard invitro bacteriological evaluation procedures possess antibacterial activity, for example, against *Staphylococcus aureus, Eberthella typhi, Pseudomonas aeruginosa, Clostridium welchii*, at test concentration levels in the range of 0.0075 mg./cc. to about 1.0 mg./cc., as illustrated below in the examples. Preferred embodiments also were found to have significant in vivo activtity against gram-positive-bacteria, e.g., *Staphylococcus aureas, Streptococcus pyogenes, Diplococcus pneumoniae*, in mice when administered orally and/or subcutaneously at dose levels in the range of about 25 to 400 mg./kg./day.

Also, preferred 1,4-dihydro-4-oxo-1,7-naphthyridine-3-carboxylic acids and esters were found to have in vivo antimalarial activity when tested against *Plasmodium berghei* infection in mice when administered orally at dose levels in the range of about 10 to 50 mg./kg./day. For example, ethyl 1,4-dihydro-4-oxo-1,6,8-trimethyl-1,7-naphthyridine-3-carboxylate and 1,4 - dihydro-4-oxo-1,6,8-trimethyl-1,7-naphthyridine-3-carboxylic acid where each was found to have in vivo activity against *Plasmodium berghei* in mice, the former when administered orally at 40 mg./kg./day (2 out of 5 mice cleared of the infection) and the latter when administered orally at 10 mg./kg./day (3 out of 5 mice cleared) and at 40 mg./kg./day (8 out of 10 mice cleared).

The following examples will further illustrate the invention without, however, limiting it thereto.

Example 1

Ethyl 1,4 - dihydro-4-oxo-1,6,8-trimethyl-1,7-naphthyridine-3-carboxylate was prepared as follows: A mixture containing 148 g. of ethyl 6,8-dimethyl-4-hydroxy-1,7-naphthyridine-3-carboxylate and 207 g. of anhydrous potassium carbonate in 3 liters of dimethylformamide was stirred on a steam bath until the naphthyridine dissolved (about 30 minutes). To this mixture was added 100 cc. of methyl idode and the resulting mitxure was heated, with stirring, for two hours on a steam bath. The hot reaction mixture was filtered and the filtrate chilled. The crystalline product was washed successively with a small amount of cold dimethylformamide, water and acetone. There was thus obtained 64 g. (41%) of the product, ethyl 1,4-dihydro-4-oxo-1,6,8-trimethyl-1,7-naphthyridine-3-carboxylate M.P. 222–225° C., which was used in Example 2 to prepare the corresponding 3-carboxylic acid. A sample was recrystallized several times from ethanol using decolorizing charcoal to yield the compound as yellow needles, M.P. 224.0–228.6° C. (corr.).

Ethyl 1,4-dihydro-4-oxo-1,6,8-trimethyl-1,7-naphthyridine-3-carboxylate was found to have in vivo activity against Staphylococcus aureus in mice when administered orally or subcutaneously at dose levels as low as 50 mg./kg./day (10 out of 10 mice orally and 19 out of 20 subcutaneously); against Streptococcus pyogenes in mice when administered orally at 100 mg./kg./day (9 out of 10 survived); and, against Diplococcus pneumoniae in mice when administered orally at 400 mk./kg./day (6 out of 10 survived). This same compound when tested according to standard in vitro bacteriological evaluation procedures was found to have bacteriostatic activtity at concentrations of 0.1 to 0.075 mg./cc., respectively, against Clostridium welchii and Pseudomonas aeruginosa.

The intermediate ethyl 6,8-dimethyl-4-hydroxy-1,7-naphthyridine-3-carboxylate was prepared as follows: To a stirred refluxing solution of 3100 cc. of diethyl phthalate was added over a period of about four minutes 312 g. of diethyl N-(2,6-dimethyl-3-pyridyl)aminomethylenemalonate. The reaction temperature dropped to about 277° C. Heating was continued for about four minutes as the temperature rose to 282° C. The source of heat was removed and ethanol was added to the hot reaction mixture with continued stirring as fast as its distillation would allow (900 cc. were added in seven minutes). The reaction mixture was allowed to cool to room temperature with stirring. The precipitate was collected, washed well with acetone, and dried in air to yeld 159 g. (60%) of the product, ethyl 6,8-dimethyl-4-hydroxy-1,7-naphthyridine-3-carboxylate, M.P. 288–291° C. with decomposition.

Following the procedure described above for the preparation of ethyl 6,8-dimethyl-4-hydroxy-1,7-naphthyridine-3-carboxylate using corresponding molar equivalent quantities of the appropriate diethyl N-(substituted-3-pyridyl)aminomethylenemalonate or N-oxide, the ethyl 4-hydroxy-1,7-naphthyridine-3-carboxylates of Table A were prepared:

TABLE A

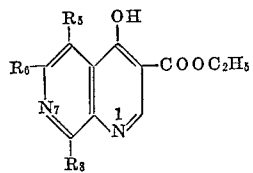

| No. | $R_5$ | $R_6$ | $R_8$ | M.P.,° C. (corr.) |
|---|---|---|---|---|
| 1 | H | $C_2H_5$ | $CH_3$ | 265.0–266.0 (dec.). |
| 2 | H | $C_2H_5$ | $C_2H_5$ | 237.0–238.2. |
| 3 | H | $CH_3CONH$ | $CH_3$ | >300.0. |
| 4 | H | $CH_3CONH$ | $CH_3CONH$ | 243.2–246.0 (dec.). |
| 5 | H | $CH_3$ | $CH_3$ | 278.0–278.8 (dec.). |
| 6 | H | H | $OCH_3$ | 253.6–255.6. |
| 7[1] | H | $CH_3$ | H | 290.5–291.0 (dec.). |
| 8 | $CH_3$ | $CH_3$ | $CH_3$ | 232–235 (dec., uncorr.). |

[1] 7-oxide.

Diethyl N-(2,6-dimethyl-3-pyridyl)aminomethylenemalonate was prepared as follows: A mixture of 77 g. of 3-amino-2,6-dimethylpyridine and 136 g. of diethyl ethoxymethylenemalonate was heated on a steam bath under reduced pressure (15 mm.) for one hour. The resulting solid was collected and recrystallized from n-heptane using decolorizing charcoal to yield 161 g. (87%) of the product, diethyl N-(2,6-dimethyl-3-pyridyl)aminomethylenemalonate, M.P. 102–103° C. A sample recrystallized from ethanol melted at 104–105.4° C. (corr.).

Following the procedure described above for the preparation of diethyl N-(2,6-dimethyl-3-pyridyl)-aminoethylenemalonate using corresponding molar equivalent quantities of the appropriate 3-aminopyridine, the N-(3-pyridyl)aminomethylene malonates of Table B were prepared:

TABLE B

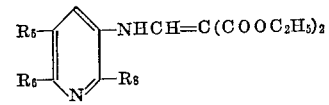

| No. | $R_5$ | $R_6$ | $R_8$ | M.P.,° C. (corr.) |
|---|---|---|---|---|
| 1 | H | $C_2H_5$ | $CH_3$ | 85.8–86.2. |
| 2 | H | $C_2H_5$ | $C_2H_5$ | 81.0–83.6. |
| 3 | H | $CH_3CONH$ | $CH_3$ | 151.6–152.8. |
| 4 | H | $CH_3CONH$ | $CH_3CONH$ | 217.0–218.0. |
| 5 | H | $CH_3$ | H | 83.6–87.6. |
| 6 | H | H | $CH_3$ | 100.0–100.8. |
| 7 | H | H | $OCH_3$ | 81–93 (uncorr.). |
| 8 | $CH_3$ | $CH_3$ | $CH_3$ | 108–109 (uncorr.). |

All of the 3-aminopyridines used in the preparation of the compounds of Table B above are known and/or are commercially available except 6-acetamido-3-amino-2-methylpyridine which was prepared in two steps from 6-amino-2-methyl-3-nitropyridine as follows: A 15.3 g. portion of 6-amino-2-methyl-3-nitropyridine was suspended in 10 cc. of pyridine and 100 cc. of acetone, and the resulting mixture was cooled, with stirring, to 5° C. in an ice bath. To this stirred mixture was added over a period of about five minutes 7.9 g. of acetyl chloride. The mixture was stirred while in the ice bath for an additional hour, then at room temperature for thirty minutes and, finally, refluxed on a steam bath for fifteen minutes. The pasty reaction mixture was poured into a mixture of ice and water (250 cc.), stirred, and the resulting solid was collected. After two recrystallizations of the solid, once from ethanol and once from acetonitrile, failed to yield a pure product, it was dissolved in ether containing a little methylene chloride and placed on a chromatographic column containing 350 g. of silica gel and ether-n-pentane (50:50) as the liquid phase. The column was then eluted with etherpentane (50:50). Evaporation of the elutes yielded a 5.3 g. fraction, a solid, which was recrystallized from ethanol to yield 5.0 g. of 6-acetamido-2-methyl-3-nitropyridine, M.P. 157.2–158.8° C. (corr.).

6-acetamido-2-methyl-3-nitropyridine was also prepared from the corresponding 6-amino compound using acetic anhydride as the acylating agent as follows: To 56.5 g. of 6-amino-2-methyl-3-nitropyridine suspended in 250 cc. of acetic anhydride was added ten drops of concentrated sulfuric acid. The resulting reaction mixture was heated on a steam bath with stirring for two hours and then allowed to stand overnight. The resulting precipitate was collected, washed with water, and air-dried to yield 50.2 g. of 6-acetamido-2-methyl-3-nitropyridine, M.P. 159–160° C.

A 19.5 g. portion of 6-acetamido-2-methyl-3-nitropyridine was hydrogenated in a Parr bottle at room temperature using 300 cc. of absolute ethanol and 2.0 g. of palladium-on-charcoal (10%). The reduction was carried out in about thirty minutes, using an initial pressure of 51 lbs. p.s.i. of hydrogen and a final pressure of 24.9 lbs. p.s.i. The reaction mixture was filtered through infusorial earth (Super Cel®) in a sintered glass funnel and the residue was rinsed with ethanol. The combined filtrates were evaporated on a steam bath at room temperature to yield a syrupy residue, which crystallized on standing. This crystalline product, 6-acetamido-3-amino-2-methylpyridine, M.P. 126–128° C., was used directly in the reaction with diethyl ethoxymethylenemalonate to yield compound No. 3 of Table B above. A sample of the 6-acetamido-3-amino-2-methylpyridine was recrystallized from ethyl acetate using decolorizing charcoal and found to melt at 128.0–129.6° C. (corr.).

3-amino-6-ethyl-2-methylpyridine, 3-amino-2,5,6-trimethylpyridine and 3-amino-2,6-diethylpyridine were obtained from Reilly Tar and Chemical Corporation.

Following the procedure described above for the preparation of ethyl 1,4-dihydro-4-oxo-1,6,8-trimethyl-1,7-naphthyridine-3-carboxylate using a corresponding molar equivalent quantity of 6,8-dimethyl-4-hydroxy-1,7-naphthyridine-3-carboxamide in place of ethyl 6,8-dimethyl-4-hydroxy-1,7-naphthyridine-3-carboxylate, there can be obtained 1,4-dihydro-4-oxo-1,6,8-trimethyl - 1,7 - naphthyridine-3-carboxamide. Alternatively, this 3-carboxamide can be obtained from the corresponding 3-carboxylic acid by reaction of its acid chloride with ammonia, as given in the following paragraph.

1,4 - dihydro - 4-oxo-1,6,8-trimethyl-1,7-naphthyridine-3-carboxamide: A mixture containing 23.2 g. of 1,4-dihydro - 4 - oxo-1,6,8-trimethyl-1,7-naphthyridine-3-carboxylic acid, 20 g. of phosphorus oxychloride and 500 cc. of chloroform was refluxed with stirring on a steam bath for three hours. To the reaction mixture containing the acid chloride of the above acid was poured with stirring 100 cc. of ammonium hydroxide, followed by addition of ice to cool the mixture. The chloroform layer was separated, dried over anhydrous potassium carbonate, and evaporated in vacuo on a steam bath to remove the chloroform. The resulting solid was recrystallized from about 90 cc. of dimethylformamide to yield 1.5 g. of 1,4-dihydro - 4 - oxo-1,6,8-trimethyl-1,7-naphthyridine-3-carboxamide, M.P. 320–325° C. with decomposition. For analysis, a portion was recrystallized again from dimethylformamide, washed with ethanol, dried and found to melt at 325–330° C. with decomposition.

*Analysis.*—Calcd. for $C_{12}H_{13}N_3O_2$: C, 62.32; H, 5.67; N, 18.17. Found: C, 62.30; H, 5.71; N, 17.93.

Example 2

1,4 - dihydro - 4-oxo-1,6,8-trimethyl-1,7-naphthyridine-3-carboxylic acid was prepared from the corresponding ethyl ester as follows: A mixture containing 64 g. of ethyl 1,4-dihydro-4-oxo-1,6,8-trimethyl-1,7-naphthyridine-3-carboxylate and 500 cc. of 5% aqueous potassium hydroxide solution was heated on a steam bath for two hours. The hot reaction mixture was treated with decolorizing charcoal and filtered. The filtrate was neutralized with 6 N hydrochloric acid. The precipitate that separated was collected and recrystallized from dimethylformamide to yield 47 g. (82%) of the product, 1,4-dihydro - 4-oxo-1,6,8-trimethyl-1,7-naphthyridine-3-carboxylic acid, M.P. 263–265° C. [261.2–263.2° C. (corr.) with decomposition].

Alternatively, 1,4 - dihydro-4-oxo-1,6,8-trimethyl-1,7-naphthyridine-3-carboxylic acid can be prepared following the procedure described in Example 1 using corresponding molar equivalent quantities of 6,8-dimethyl-4 - hydroxy - 1,7 - naphthyridine - 3-carboxylic acid and methyl iodide. The intermediate 6,8-dimethyl-4-hydroxy-1,7-naphthyridine-3-carboxylic acid was prepared by hydrolysis of its corresponding ethyl ester as follows: A mixture containing 54 g. of ethyl 6,8-dimethyl-4-hydroxy-1,7-naphthyridine-3-carboxylate and 340 cc. of 10% aqueous potassium hydroxide solution was heated on a steam bath for ninety minutes. The reaction mixture was acidified with hydrochloric acid and the resulting precipitate was collected, washed successively with water and ethanol, and recrystallized twice from ethanol to yield 6.1 g. of the product, 6,8-dimethyl-4-hydroxy-1,7-naphthyridine-3-carboxylic acid, M.P. 284.0–284.2° C. (corr.), with decomposition.

1,4 - dihydro - 4-oxo-1,6,8-trimethyl-1,7-naphthyridine-3-carboxylic acid can be prepared as its 7-oxide in several steps as follows: oxidizing ethyl 6,8-dimethyl-4-hydroxy-1,7-naphthyridine-3-carboxylate by reaction with peracetic acid in acetic acid or with 3-chloroperbenzoic acid in chloroform; reacting the resulting 3-carbethoxy-6,8-dimethyl-4-hydroxy-1,7-naphthyridine-7-oxide, M.P. 270.0–270.6° C. (corr.) with decomposition, with methyl iodide to obtain 3-carbethoxy-1,4-dihydro-4-oxo-1,6,8-trimethyl-1,7-naphthyridine-7-oxide, M.P. 223.0–225.0° C. (corr.); and, hydrolyzing the latter by reaction with aqueous potassium hydroxide solution to form 3-carboxy-1,4-dihydro-4-oxo-1,6,8-trimethyl-1,7-naphthyridine-7-oxide.

1,4 - dihydro - 4-oxo-1,6,8-trimethyl-1,7-naphthyridine-3-carboxylic acid was found to have in vivo activity against *Staphylococcus aureus* in mice when administered orally or subcutaneously at dose levels as low as 25 mg./kg./day (9 out of 10 mice survived orally and 8 out of 10 subcutaneously); against *Streptococcus pyogenes* in mice when administered orally at 100 mg./kg./day (9 out of 10 survived); and, against *Diplococcus pneumoniae* in mice when administered orally at 400 mg./kg./day (7 out of 10 survived). This same compound was found to have an acute oral toxicity ($LD_{50}$) in mice of 1930±310 mg./kg. after twenty-four hours and 1800±300 mg./kg. after seven days and, as its sodium salt, an acute subcutaneous toxicity ($LD_{50}$) in mice of 600±59 mg./kg.

1,4 - dihydro -4- oxo-1,6,8-trimethyl-1,7-naphthyridine-3-carboxylic acid when tested according to standard in vitro bacteriological procedures was found to possess antibacterial activity, for example, as follows:

| Organism | Minimum Effective Concentration (mg./cc.) | |
|---|---|---|
| | Bacteriostatic | Bacteriocidal |
| *Staphylococcus aureus* | 0.0075 | 0.750 |
| *Eberthella typhi* | 0.075 | 1.000 |
| *Clostridium welchii* | 0.010 | 0.500 |

Example 3

Ethyl 1,4 - dihydro - 6 - ethyl-1,8-dimethyl-4-oxo-1,7-naphthyridine-3-carboxylate, M.P. 241.8–242.2° C. (corr.), was prepared (56.5% yield) following the procedure described in Example 1 using 14.3 g. of ethyl 6-ethyl - 4 - hydroxy-8-methyl-1,7-naphthyridine-3-carboxylate, 11.0 g. of anhydrous potassium carbonate, 5.0 cc. of methyl iodide and 130 cc. of dimethylformamide.

Example 4

1,4 - dihydro-6-ethyl-1,8-dimethyl-4-oxo-1,7-naphthyridine-3-carboxylic acid, M.P. 245.0–246.8° C. (corr.), was prepared (98% yield) following the procedure described in Example 2 using 10.2 g. of ethyl 1,4-dihydro-6-ethyl-1,8 - dimethyl-4-oxo-1,7-naphthyridine-3-carboxylate, 25 cc. of 10% aqueous potassium hydroxide solution and 100 cc. of water.

1,4 - dihydro-6-ethyl-1,8-dimethyl-4-oxo-1,7-naphthyridine-3-carboxylic acid was found to have in vivo activity against *Staphylococcus aureus* in mice when administered subcutaneously at a dose level of 400 mg./kg./day (10 out of 10 mice survived). When tested by standard in vitro bacteriological evaluation procedures, this compound was found to have bacteriostatic activity against *Staphylococcus aureus* at a concentration of 0.025 mg./cc.

Example 5

Following the procedure described in Example 1 using 9.3 g. of ethyl 6-ethyl-8-methyl-4-hydroxy-1,7-naphthyridine-3-carboxylate, 7.5 g. of anhydrous potassium carbonate, 6.0 cc. of ethyl iodide and 85 cc. of dimethylformamide, there was prepared 0.9 g. of ethyl 1,4-dihydro-1,6-diethyl - 8-methyl-4-oxo-1,7-naphthyridine-3-carboxylate, M.P. 156.8–158.8° C. (corr.).

Ethyl 1,4-dihydro-1,6-diethyl-8-methyl-4-oxo-1,7-naphthyridine-3-carboxylate when tested by standard in vitro bacteriological procedures was found to have bacteriostatic activity against *Staphylococcus aureus* at a concentration of 1.0 mg./cc.

The above ester was hydrolyzed to yield the corresponding acid, as follows: A small portion of the ester was heated on a steam bath with 10% aqueous potassium hydroxide solution for thirty minutes. The reaction mixture was acidified to a pH of 3.5 using hydrochloric acid. The resulting precipitate was collected, washed with water and dried in a vacuum oven at 60° C. to yield the acid, 1,4 - dihydro - 1,6-diethyl-8-methyl-4-oxo-1,7-naphthyridine-3-carboxylic acid, M.P. 156.8–158.8° C. (corr.).

Example 6

Following the procedure described in Example 1 using 7.2 g. of ethyl 6,8-diethyl-4-hydroxy-1,7-naphthyridine-3-carboxylate, 18.0 g. of anhydrous potassium carbonate, 20.1 cc. of ethyl iodide and 70 cc. of dimethylformamide, there was obtained 2.0 g. of ethyl 1,4-dihydro-1,6,8-triethyl-4-oxo-1,7-naphthyridine-3-carboxylate, M.P. 127.6–129.0° C. (corr.).

Ethyl 1,4 - dihydro - 1,6,8-triethyl-4-oxo-1,7-naphthyridine-3-carboxylate when tested by standard in vitro bacteriological procedures was found to have bacteriostatic activity against *Staphylococcus aureus* at a concentration of 0.75 mg./cc.

The above ester was hydrolyzed to yield the corresponding acid, as follows: A small portion of the ester was heated on a steam bath with 10% aqueous potassium hydroxide solution for fifteen minutes. The reaction mixture was acidified to a pH of 3.5 using hydrochloric acid. The resulting precipitate was collected, washed with water and recrystallized from acetone to yield the acid, 1,4-dihydro - 1,6,8-triethyl-4-oxo-1,7-naphthyridine-3-carboxylic acid, M.P. 151–153° C.

Example 7

Following the procedure described in Example 1 using 117 g. of ethyl 6-acetamido-4-hydroxy-8-methyl-1,7-naphthyridine-3-carboxylate, 224 g. of anhydrous potassium carbonate, 173 g. of methyl iodide and 1170 cc. of dimethylformamide, there was obtained 76.1 g. of ethyl 6-acetamido - 1,4-dihydro-1,8-dimethyl-4-oxo-1,7-naphthyridine-3-carboxylate, M.P. 314–316° C. with decomposition. Recrystallization of a 15 g. portion from dimethylformamide, using decolorizing charcoal, yielded 11.5 g. of the ester, M.P. 335–336° C. with decomposition.

Ethyl 6 - acetamido-1,4-dihydro-1,8-dimethyl-4-oxo-1,7-naphthyridine-3-carboxylate when tested according to standard in vitro bacteriological procedures was found to have bacteriostatic activity against *Eberthella typhi* and *Pseudomonas aeruginosa* at a concentration of 0.1 mg./cc. for each organism.

Example 8

6 - amino - 1,4 - dihydro-1,8-dimethyl-4-oxo-1,7-naphthyridine-3-carboxylic acid was prepared as follows: A mixture containing 7.6 g. of ethyl 6-acetamido-1,4-dihydro-1,8 - dimethyl - 4-oxo-1,7-naphthyridine-3-carboxylate, 35 cc. of 10% aqueous potassium hydroxide solution and 100 cc. of water was refluxed with stirring for about ninety minutes and then filtered through a sintered glass funnel. The hot filtrate was acidified with concentrated hydrochloric acid; the resulting precipitate was collected, washed with a little water, and recrystallized from dimethylformamide using decolorizing charcoal to yield 1.4 g. of the product, 6-amino-1,4-dihydro-1,8-dimethyl-4-oxo-1,7-naphthyridine-3-carboxylic acid, M.P. >300.0° C.

6 - amino - 1,4 - dihydro-1,8-dimethyl-4-oxo-1,7-naphthyridine-3-carboxylic acid when tested according to standard in vitro bacteriological procedures was found to possess antibacterial activity, for example, as follows:

| Organism | Minimum Effective Concentration (mg./cc.) | |
| --- | --- | --- |
| | Bacteriostatic | Bacteriocidal |
| *Staphylococcus aureus* | 0.1 | 0.75 |
| *Eberthella typhi* | 0.25 | 0.75 |

Example 9

(A) 1,4 - dihydro - 1,8-dimethyl-6-hydroxy-4-oxo-1,7-naphthyridine-3-carboxylic acid was prepared from the corresponding 6-amino compound as follows: To a suspension of 16.9 g. of 6-amino-1,4-dihydro-1,8-dimethyl-4-oxo-1,7-naphthyridine-3-carboxylic acid and 112 cc. of water chilled in an ice bath was added dropwise with stirring over a period of about twenty minutes 85 cc. of sulfuric acid. The temperature of the reaction mixture ranged between 20 and 30° C. The resulting solution was cooled to 0° C. and a solution containing 10.0 g. of sodium nitrite in 16 cc. of water was added dropwise over a period of seventy-two minutes, with the dropping tube extended below the surface of the reaction solution. The temperature of the reaction mixture was maintained between —3° to 2° C. using a salt-ice bath. The clear yellow solution was stirred for an additional twenty minutes and then poured into 350 cc. of hot water (95° C.). The reaction mixture was heated on a steam bath for thirty-five minutes and then allowed to stand overnight. It was then cooled in an ice bath and the solid that separated was collected and dissolved in dilute potassium hydroxide solution. The solution was treated with decolorizing charcoal, filtered, and the filtrate was acidified to a pH of 5.5 using acetic acid. The yellow solid that separated was collected, washed well with water, recrystallized from dimethylformamide using decolorizing charcoal, washed with acetone and dried in a vacuum oven (about 70° C.) to yield 6.8 g. (40%) of the product, 1,8-dimethyl-6-hydroxy-4-oxo-1,7-naphthyridine-3-carboxylic acid, M.P. >300.0° C. (corr.).

1,4 - dihydro - 1,8 - dimethyl - 6 - hydroxy-4-oxo-1,7-naphthyridine-3-carboxylic acid when tested by standard in vitro bacteriological procedures was found to have bacteriostatic activity against *Clostridium welchii* at a concentration of 0.75 mg./cc.

(B) Methyl 1,4 - dihydro - 1,8-dimethyl-6-methoxy-4-oxo-1,7-naphthyridine-3-carboxylate is obtained by heating on a steam bath for six hours with stirring 1,4-dihydro-1,8 - dimethyl - 6 - hydroxy - 4-oxo-1,7-naphthyridine-3-carboxylic acid in dimethylformamide with an excess (more than two-fold) of methyl iodide and anhydrous potassium carbonate. The product is isolated by pouring the reaction mixture into water, cooling the mixture, and collecting the product by filtration.

Example 10

Ethyl 6,8-diacetamido-1,4-dihydro-1-methyl-4-oxo-1,8-naphthyridine-3-carboxylate (0.5 g.), M.P. >300.0° C., was prepared following the procedure described in Example 1 using 2.6 g. of ethyl 6,8-diacetamido-4-hydroxy-1,7-naphthyridine-3-carboxylate, 1.5 g. of methyl iodide, 25 cc. of dimethylformamide and 1.4 g. of anhydrous potassium carbonate.

Ethyl 6,8-diacetamido-1,4-dihydro-1-methyl-4-oxo-1,8-naphthyridine-3-carboxylate when tested by standard in vitro bacteriological procedures was found to have bacteriostatic activity against *Eberthella typhi* at a concentration of 1.0 mg./cc.

Example 11

3 - carboxy - 1,4 -dihydro - 1 - methyl - 4 - oxo - 1,7-naphthyridine-7-oxide was prepared as follows: A 14.4 g. portion of 3 - carboxy - 4-hydroxy-1,7-naphthydridine-7-oxide was dissolved in 102 cc. of 10% aqueous potassium hydroxide solution with heating. To this solution was added 350 cc. of ethanol and 50 cc. of water, and the resulting mixture was heated on a steam bath and filtered to remove a small quantity (less than 1 g.) of a precipitate. The filtrate was refluxed and to it was added methyl iodide in 5 cc. portions at about five-minute intervals over a period of fifty minutes. The pH was adjusted to 8.5 using 10% aqueous potassium hydroxide solution; the mixture was cooled to about 20° C.; the solid was collected, washed with 30 cc. of 2 to 1 ethanol-water and then with ethanol, and dried at 70° C. in a vacuum oven to yield 12.6 g. (70%) of the potassium salt of 3-carboxy-1,4-dihydro-1-methyl-4-oxo-1,7-naphthyridine-7-oxide, M.P. 357° C. with decomposition. A 7.6 g. portion of the potassium salt was dissolved in 150 cc. of water and the solution was filtered. The filtrate was acidified by dropwise addition of 6 N hydrochloric acid to a pH of 5. The solid was collected, triturated successively with warm water and ethanol, dried at 100° C. in a vacuum oven, and then recrystallized from dimethylformamide to yield 3.5 g. of 3 - carboxy-1,4-dihydro-1-methyl-4-oxo-1,7-naphthyridine-7-oxide, M.P. >300° C. with decomposition, after triturating with ethanol and drying in a vacuum oven at 80° C.

The intermediate 3-carboxy-4-hydroxy-1,7-naphthyridine-7-oxide was prepared by hydrolysis of the corresponding ethyl ester as follows: A mixture containing 54.2 g. of 3-carbethoxy-4-hydroxy-1,7-naphthyridine-7-oxide and 360 cc. of 10% aqueous potassium hydroxide solution was heated on a steam bath for one hour. The reaction solution was then acidified to a pH of 6 and filtered. The filtrate was made acidic to Congo red and the separated precipitate was collected and recrystallized from water, using decolorizing charcoal, to yield 35.7 g. (75%) of the product, 3-carboxy-4-hydroxy-1,7-naphthyridine-7-oxide. A small sample for analysis was recrystallized a second time from water and found to have no change in the melting point, M.P. 298.2–299.0° C. (corr.) with decomposition.

Example 12

3 - carboxy - 1,4 - dihydro - 1 - ethyl - 4 - oxo - 1,7-naphthyridine-7-oxide was prepared as follows: A mixture containing 8.0 g. of 3-carboxy-4-hydroxy-1,7-naphthyridine-7-oxide, 75 cc. of 10% aqueous potassium hydroxide solution, 125 cc. of ethanol and 8.1 cc. of ethyl iodide was refluxed on a steam bath for five hours. After two and one-half hours of refluxing, 50 cc. of 10% aqueous potassium hydroxide solution, 8 cc. of ethyl iodide and 25 cc. of ethanol were added. The reaction mixture was filtered, the filtrate acidified to a pH of 3 with hydrochloric acid and then concentrated to dryness. The residual material was triturated with 75 cc. of hot ethanol and the undissolved material was collected and triturated a second time with 50 cc. of water. The undissolved material was collected, washed with water, dried and recrystallized from dimethylformamide to yield 1.5 g. (16%) of the product, 3-carboxy-1,4-dihydro-1-ethyl-4-oxo-1,7-naphthyridine-7-oxide, M.P. >300.0° C. (corr.).

Example 13

1,4-dihydro-1-methyl - 4 - oxo - 1,7 - naphthyridine-3-carboxylic acid was prepared by catalytic hydrogenation of the corresponding 7-oxide as follows: 9.8 g. of the potassium salt of 3-carboxy-1,4-dihydro-1-methyl-4-oxo-1,7-naphthyridine-7-oxide in a mixture containing 300 cc. of water and 5 g. of Raney nickel was reduced at room temperature in a Parr apparatus using an initial pressure of 55 lbs. p.s.i. of hydrogen. The catalyst was filtered off and the filtrate was carefully acidified to a pH of 5.5–6.0. The small amount of solid (about 0.7 g.) was filtered off and the filtrate was acidified to a pH of 3. The resulting precipitate was collected, washed successively with water and ethanol, recrystallized twice from dimethyl-formamide, triturated with ethanol, and dried at 80° C. in vacuo to yield 4.1 g. of the product, 1,4-dihydro-1-methyl-4-oxo-1,7-naphthyridine-3-carboxylic acid, M.P. 281.2–281.8° C. (corr.), with decomposition.

1,4-dihydro-1-methyl - 4 - oxo - 1,7 - naphthyridine - 3-carboxylic acid when tested according to standard in vitro bacteriological evaluation procedures was found to have bacteriostatic activity at concentrations of 0.75, 0.50, 0.25 and 1.0 mg./cc., respectively, against *Staphylococcus aureus, Eberthella typhi, Clostridium welchii* and *Pseudomonas aeruginosa.*

Example 14

1,4-dihydro - 1 - ethyl - 4 - oxo - 1,7 - naphthyridine - 3-carboxylic acid was prepared following the procedure described in Example 13 using 2.8 g. of 1,4-dihydro-1-ethyl-3-carboxy-4-oxo-1,7-naphthyridine-7-oxide, 6.2 cc. of 10% aqueous potassium hydroxide solution, 144 cc. of water, about 2 g. of Raney nickel, and an initial pressure of hydrogen of 53 lbs. p.s.i. There was thus obtained 2.0 g. of the product, 1,4-dihydro-1-ethyl-4-oxo-1,7-naphthyridine-3-carboxylic acid, M.P. >300.0° C. (corr.), after one recrystallization from dimethylformamide.

1,4-dihydro - 1 - ethyl - 4 - oxo - 1,7 - naphthyridine - 3-carboxylic acid when tested by standard in vitro bacteriological procedures was found to have bacteriostatic activity against *Eberthella typhi* at a concentration of 0.75 mg./cc. This compound was found to have in vivo activity against *Staphylococcus aureus* in mice when administered orally at a dose level of 100 mg./kg./day (4 out of 10 mice survived).

Example 15

Ethyl 1,4 - dihydro - 6,8 - diethyl - 1 - methyl - 4 - oxo-1,7-naphthyridine-3-carboxylate was prepared as follows: A mixture containing 13.7 g. of ethyl 6,8-diethyl-4-hydroxy-1,7-naphthyridine-3-carboxylate, 11.0 g. of anhydrous potassium carbonate and 100 cc. of dimethyl-formamide was heated on a steam bath with stirring for about fifteen minutes. To the stirred mixture was added 4 cc. of methyl iodide and heating was continued on the steam bath for three and one-half hours with subsequent additions of 4 cc. portions of methyl iodide at the end of each of the first and second hours. The reaction mixture was filtered to remove the solid and the filtrate was concentrated to dryness. The residue was triturated with 100 cc. of ethanol and the undissolved material was filtered off. The ethanol solution was concentrated to dryness, the residue taken up with 100 cc. of chloroform, the chloroform solution washed twice with water and concentrated in vacuo to dryness. The residue was dissolved in benzene, the benzene solution washed twice with water, concentrated to near dryness and treated with n-hexane whereupon a solid separated. The solid was collected and dried to yield 11.0 g. (76.5%) of the product, ethyl 1,4-dihydro-6,8-diethyl-1-methyl-4-oxo-1,7-naphthyridine-3-carboxylate, M.P. 150–154° C. Two recrystallizations of the product from benzene yielded a sample melting at 154–157° C.

Example 16

1,4 - dihydro - 6,8 - diethyl - 1 - methyl - 4 - oxo - 1,7-naphthyridine-3-carboxylic acid was prepared as follows: A mixture containing 11.5 g. of ethyl 1,4-dihydro-6,8-diethyl-1-methyl-4-oxo-1,7-naphthyridine-3-carboxylate, 32 cc. of 10% potassium hydroxide solution and about 50 cc. of ethanol was heated on a steam bath for about forty-five minutes, allowing the ethanol to evaporate from the reaction mixture. The mixture was diluted with about 500 cc. of water, the mixture filtered, and the filtrate neutralized with 6 N hydrochloric acid. The resulting solid was collected, washed with water and dried to yield 8.2 g. (83%) of the product, M.P. 185–187° C. The above 8.2 g. portion of the product was combined with a 6.1 g. portion from another preparation and recrystallized from about 600 cc. of ethanol, dried at 80° C. in a vacuum oven for four hours to yield 13.0 g. of the product, M.P. 185.6–187.2° C. (corr.).

Example 17

Ethyl 1,4-dihydro - 1,8 - dimethyl - 4 - oxo - 1,7 - naphthyridine-3-carboxylate, M.P. 180.2–181.2° C. (corr.), was obtained following the procedure described in Example 1 using corresponding molar equivalent quantities of ethyl 4-hydroxy-8-methyl-1,7-naphthyridine-3-carboxylate, anhydrous potassium carbonate and methyl iodide.

1,4 - dihydro - 1,8 - dimethyl - 4 - oxo - 1,7 - naphthyridine-3-carboxylic acid is obtained by hydrolyzing the above ester following the procedure described in Example 2 using corresponding molar equivalent quantities of the reactants.

Example 18

Ethyl 1,4 - dihydro - 8 - methoxy - 1 - methyl - 4 - oxo-1,7-naphthyridine-3- carboxylate is obtained following the procedure described in Example 1 using corresponding molar equivalent quantities of ethyl 4-hydroxy-8-methoxy- 1,7-naphthyridine-3-carboxylate, potassium carbonate, methyl iodide and dimethylformamide.

The corresponding acid, 1,4 - dihydro - 8 - methoxy-1 - methyl - 4 - oxo - 1,7-naphthyridine - 3 - carboxylic acid, is obtained by hydrolyzing the above ester following the procedure described in Example 2 using corresponding molar equivalent quantities of the reactants.

Example 19

3 - carboxy - 1,4 - dihydro - 1,6 - dimethyl - 4 - oxo-1,7,naphthyridine-7-oxide is obtained following the procedure desrribed in Example 11 using corresponding molar equivalent quantities of 3-carboxy-4-hydroxy-6-methyl-1,7-naphthyridine-7-oxide, potassium hydroxide and methyl iodide. The intermediate 3-carboxy-4-hydroxy-6-methyl-1,7-naphthyridine-7-oxide is obtained by hydrolyzing its ethyl ester following the procedure described in Example 11.

1,4 - dihydro - 1,6 - dimethyl - 4 - oxo - 1,7 - naphthyridine-3-carboxylic acid is obtained by catalytic hydrogenation of the above-corresponding 7-oxide following the procedure described in Example 13 using corresponding molar equivalent quantities of the reactants.

The intermediate 3-carbethoxy-4-hydroxy-6-methyl-1,7-naphthyridine-7-oxide is obtained in two steps as follows: To a stirred solution containing 11.0 g. of diethyl N - (6 - methyl - 3 - pyridyl)aminomethylenemalonate and 10 cc. of acetic acid warmed to 55° C. was added portionwise over a period of thirty minutes 7.3 cc. of 40% peracetic acid. The reaction mixture was stirred for an additional ninety minutes at about 60° C. and then allowed to stand overnight. The reaction mixture was evaporated to dryness and the resulting syrupy residue was dissolved in 50 cc. of isopropyl alcohol. A small portion of the alcohol solution was evaporated to remove the alcohol and the residue was triturated with n-pentane until crystallization occurred. The isopropyl alcohol solution was seeded with the crystals whereupon a crystalline precipitate separated. The mixture was chilled well and the precipitate collected. The precipitate was triturated with hot isopropyl ether and filtered to yield 1.4 g. of a pale yellow powder, M.P. 132–134° C. This material was dissolved in hot benzene, the solution filtered, and n-pentane added to the hot filtrate to the point of turbidity. The solution was cooled and the pale yellow precipitate was collected and air-dried to yield the 1-oxide of diethyl N - (6 - methyl - 3 - pyridyl)aminomethylenemalonate, M.P. 134–136° C. This compound is cyclized following the procedure described in Example 1 to yield 3-carbethoxy-4-hydroxy-6-methyl-1,7-naphthyridine-7-oxide.

The compounds of Table C were prepared following the indicated above described procedures using corresponding molar equivalent quantities of the appropriate reactants.

TABLE C

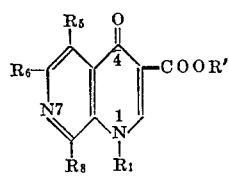

| Prep'n. Like Ex. | R' | $R_1$ | $R_5$ | $R_6$ | $R_8$ | M.P.,° C. (corr.) |
|---|---|---|---|---|---|---|
| 1 | $C_2H_5$ | $CH_3$ | $CH_3$ | $CH_3$ | $CH_3$ | [1]. |
| 2 | H | $CH_3$ | $CH_3$ | $CH_3$ | $CH_3$ | 242.0–243.8. |
| 1 [2] | $C_2H_5$ | $CH_3$ | H | $CH_3$ | H | [1]. |
| 2 [2] | H | $CH_3$ | H | $CH_3$ | H | >300. |
| 1 [2] | $C_2H_5$ | $C_2H_5$ | H | $CH_3$ | H | [1]. |
| 2 [2] | H | $C_2H_5$ | H | $CH_3$ | H | >300. |
| 13 | H | $CH_3$ | H | $CH_3$ | H | >300. |
| 13 | H | $C_2H_5$ | H | $CH_3$ | H | 283.0–283.8 (dec.). |
| 1 [2] | $C_2H_5$ | $C_3H_7$-n | H | $CH_3$ | H | [1]. |
| 2 [2] | H | $C_3H_7$-n | H | $CH_3$ | H | 291–293 [3] (dec.). |
| 13 | H | $C_3H_7$-n | H | $CH_3$ | H | 241.0–243.0. |

[1] Used to prepare acid (R'=H).
[2] 7-oxide.
[3] Uncorrected M.P.

Example 20

The following reaction of ethyl 4-hydroxy-8-methyl-1,7-naphthyridine-3-carboxylate with methyl iodide in the presence of anhydrous potassium carbonate yielded both ethyl 1,4 - dihydro - 1,8 - dimethyl - 4 - oxo - 1,7 - naphthyridine-3-carboxylate (20A) and 3-carbethoxy-7,8-dimethyl-4-hydroxy-1,7-naphthyridinium iodide (20B).

(A) A mixture containing 28.0 g. of ethyl 4-hydroxy-8-methyl-1,7-naphthyridine-3-carboxylate, 25 g. of anhydrous potassium carbonate and 300 cc. of dimethylformamide was heated with stirring on a steam bath until most of the solids had dissolved. The mixture was then cooled slightly; 12 cc. of methyl iodide was added; and the reaction mixture was heated on the steam bath with stirring for two hours. The reaction mixture was filtered, the filtrate diluted with an equal volume of water, and a small amount of concentrated hydrochloric acid was added to decrease basicity. When no precipitate resulted, the resulting solution was evaporated to drynes. The residue was treated with about 500 cc. of water and the remaining green solid was collected and dried (10.0 g., M.P. 228° C. with decomposition; workup below, 20B). The filtrate was extracted seven times with 200 cc. portions of chloroform. The combined extracts were washed twice with water and dried over anhydrous sodium sulfate. The chloroform was evaporated off on a steam bath at atmospheric pressure. To the residue was added a small quantity of water and the mixture evaporated on a steam bath at atmospheric pressure. There was obtained 3.6 g. of solid which was recrystallized twice from absolute ethanol, the first time using decolorizing charcoal, and dried in a vacuum oven to yield 1.65 g. of ethyl 1,4-dihydro - 1,8 - dimethyl - 4 - oxo - 1,7 - naphthyridine - 3-carboxylate, M.P. 178.5–180.5° C.

Analysis.—Calcd. for $C_{13}H_{14}N_2O_3$: C, 63.40; H, 5.73; N, 11.38. Found: C, 63.02; H, 5.98; N, 11.27.

(B) A 5 g. portion of the above green solid was recrystallized from water using decolorizing charcoal and the resulting pale greenish-yellow solid was dried in a vacuum oven to yield 3.6 g. of 3-carbethoxy-7,8-dimethyl-4-hydroxy-1,7-naphthyridinium iodide, M.P. 221.0–226.0° C. (corr.) with decomposition.

Analysis.—Calcd. for $C_{13}H_{15}IN_2O_3$: C, 41.73; H, 4.04; I, 33.92; N, 7.49. Found: C, 41.80; H, 4.23; I, 34.00; N, 6.91, 6.95.

Example 21

Ethyl 8-acetoxymethyl-1,4-dihydro-1,6-dimethyl-4-oxo-1,7-naphthyridine-3-carboxylate.—A mixture containing 27.0 g. of ethyl 8-acetoxymethyl-4-hydroxy-6-methyl-1,7-naphthyridine-3-carboxylate, 250 cc. of dimethylformamide, 27.6 g. of anhydrous potassium carbonate and 13.2 cc. of methyl iodide was heated with stirring on a steam bath for seventy minutes. To the mixture was added 4.2 cc. of methyl iodide and the resulting reaction mixture heated an additional ten minutes. The hot reaction mixture was filtered and the filtrate chilled. The solid that separated was collected, recrystallized from one liter of ethanol, and dried in a vacuum oven at 50° C. to yield 15.0 g. (53%) of ethyl 8-acetoxymethyl-1,4-dihydro - 1,6 - dimethyl - 4 - oxo-1,7-naphthyridine-3-carboxylate, M.P. 217–218° C. This compound was also prepared (Example 28A below) by reaction of the 7-oxide of ethyl 1,4-dihydro-4-oxo-1,6,8-trimethyl-1,7-naphthyridine-3-carboxylate with acetic anhydride in acetic acid.

Example 22

1,4 - dihydro - 1,6 - dimethyl - 8 - hydroxymethyl-4-oxo-1,7-naphthyridine-3-carboxylic acid.—Nitrogen gas was bubbled thru a solution containing 34 cc. of 10% aqueous potassium hydroxide and 34 cc. of water while heating the solution on a steam bath for about fifteen minutes. The solution was allowed to cool a little, 9.55 g. of ethyl 8 - acetoxymethyl - 1,4 - dihydro-1,6-dimethyl-4-oxo-1,7- naphthyridine-3-carboxylate was added, and the mixture was heated (over nitrogen) for twenty minutes. To the reaction mixture was added 6.0 cc. of 6 N hydrochloric acid in 50 cc. of water. The solid that separated was collected and recrystallized twice from acetic acid, washed with ethyl acetate, and dried in a vacuum oven at 60° C. to yield 4.8 g. (65%) of 1,4-dihydro-1,6-dimethyl-8-hydroxymethyl-4-oxo-1,7-naphthyridine-3-carboxylic acid, M.P. 223.0–225.0° C. (corr.).

*Analysis.*—Calcd. for $C_{12}H_{12}N_2O_4$: C, 58.06; H, 4.87; N, 11.29. Found: C, 57.97; H, 5.08; N, 11.39.

1,4 - dihydro - 1,6-dimethyl-8-hydroxymethyl-4-oxo-1, 7-naphthyridine-3-carboxylic acid was found to have in vivo activity against *Staphylococcus aureus* in mice when administered subcutaneously at a dose level of 200 mg./kg./day (18 out of 20 mice survived) and orally at a dose level of 100 mg./kg./day (7 out of 10 mice survived).

Example 23

1,4,5,6,7,8 - hexahydro-4-oxo-1,6,8-trimethyl-1,7-naphthyridine-3-carboxylic acid.—A mixture containing 13.9 g. of 1,4-dihydro-1,6,8-trimethyl-4-oxo-1,7-naphthyridine-3-carboxylic acid, 20 cc. of 6 N hydrochloric acid, 1 g. of palladium-on-charcoal and enough water to bring the total volume of the reaction mixture to 300 cc. was hydrogenated at 50° C. for seventy-five minutes, with the initial pressure of hydrogen being 59 p.s.i. and the final pressure being 49 p.s.i. The catalyst was filtered off and the filtrate evaporated in vacuo. The solid residue was first triturated with acetone and then boiled with about 800 cc. of ethanol (not all solid dissolved), and the hot mixture was filtered. The filtrate was chilled and the resulting solid was collected. Since both the unrecrystallized and the recrystallized material had the same melting point, they were combined to yield 13.3 g. (81%) of the white crystalline product, 1,4,5,6,7,8-hexahydro-4-oxo-1,6,8-trimethyl-1,7-naphthyridine-3-carboxylic acid as its hydrochloride, M.P. 293.6–294.0° C. (corr.) with decomposition.

*Analysis.*—Calcd. for $C_{12}H_{16}N_2O_3 \cdot HCl$: N, 10.27; Cl, 13.00; Base, 86.6. Found: N, 10.41; Cl, 12.70; Base, 86.63.

Example 24

7 - benzyl - 1,4,5,6,7,8-hexahydro-4-oxo-1,6,8-trimethyl-1,7-naphthyridine-3-carboxylic acid.—A mixture containing 13.2 g. of 1,4,5,6,7,8-hexahydro-4-oxo-1,6,8-trimethyl-1,7-naphthyridine-3-carboxylic acid hydrochloride, 75 cc. of dimethylformamide and 40 g. of anhydrous potassium carbonate was heated with stirring on a steam bath for thirty minutes. To the mixture was added 25.4 g. of benzyl chloride and 1.5 g. of potassium iodide, and the resulting mixture was heated with stirring for four hours on a steam bath. The mixture was filtered to remove some insoluble material and the filtrate was concentrated to remove the solvent. The remaining liquid residue was shaken several times with ether (to remove any benzyl chloride) and then shaken with water. After removal of the water by decantation, the material was treated with 20 cc. of water and 20 cc. of 6 N hydrochloric acid, and the resulting mixture was heated on a steam bath for about four and one-half hours. The resulting mixture was diluted with water to a volume of about 80 cc. and washed once with chloroform. The resulting aqueous solution was neutralized (to a pH of 5.5–6.0) with 10% aqueous potassium hydroxide. The resulting yellow tarry material was separated by decanting the liquid, washed with water, crystallized from about 40 cc. of ethanol, and then recrystallized twice from ethanol to yield 5.6 g. of white crystalline product, 7-benzyl-1,4,5,6,7,8-hexahydro - 4 - oxo - 1,6,8 - trimethyl-1,7-naphthyridine-3-carboxylic acid, M.P. 158.2–160.0° C. (corr.).

*Analysis.*—Calcd. for $C_{19}H_{22}N_2O_3$: C, 69.92; H, 6.79; N, 8.58. Found: C, 70.17; H, 7.00; N, 8.69.

Example 25

The reaction of 3-carbethoxy-6,8-dimethyl-4-hydroxy-1,7-naphthyridine-7-oxide with acetic anhydride in acetic acid yielded two products, namely, ethyl 8-acetoxymethyl-4 - hydroxy - 6 - methyl - 1,7 - naphthyridine-3-carboxylate (25A) and ethyl 4,5-dihydroxy-6,8-dimethyl-1,7-naphthyridine-3-carboxylate (25B).

(A) A mixture containing 121 g. of 3-carbethoxy-4-hydroxy-6,8-dimethyl - 4 - hydroxy-1,7-naphthyridine-7-oxide, 70 g. of acetic anhydride and 300 cc. of acetic acid was stirred on a steam bath for eight hours. The reaction mixture was allowed to cool to room temperature; the resulting solid was collected, washed with ethyl acetate, and dried to yield 26.5 g. of solid, M.P. 275–295° C. with decomposition (see Example 25B below). The filtrate obtained after removal of the above compound from the reaction mixture was combined with the ethyl acetate washings and the ethyl acetate was removed by heating in vacuo. The residual material was triturated with 500 cc. of hot ethyl acetate, the hot mixture filtered, and the collected solid dried and recrystallized from dimethylformamide to yield 49 g. of ethyl 8-acetoxy-methyl-4-hydroxy-6-methyl-1,7-naphthyridine-3-carboxylate, M.P. 225–227° C. A second crop was obtained from the ethyl acetate washings by distilling off the ethyl acetate, triturating the residue with 100 cc. of ethyl acetate, and recrystallizing this material from 500 cc. of ethanol using decolorizing charcoal to yield 11.1 g. of ethyl 8-acetoxymethyl - 4 - hydroxy-6-methyl - 1,7 - naphthyridine-3-carboxylate, M.P. 225.4–227.0° C. (corr.).

*Analysis.*—Calcd. for $C_{15}H_{16}N_2O_5$: C, 59.20; H, 5.30; N, 9.21. Found: C, 59.41; H, 5.49; N, 9.29.

(B) 4,5-dihydroxy-6,8-dimethyl - 1,7 - naphthyridine-3-carboxylic acid.—The 26.5 g. of solid obtained in Example 25A above was triturated with 400 cc. of warm chloroform, the mixture filtered, and the solid recrystallized from 175 cc. of dimethylformamide to yield 13.0 g. of ethyl 4,5-dihydroxy-6,8-dimethyl-1,7-naphthyridine-3-carboxylate, M.P. 310–313° C. with decomposition. This ester was converted into its corresponding acid as follows: A portion of the ester was boiled a few minutes with 10% aqueous potassium hydroxide solution and the solution acidified with hydrochloric acid to a pH of 4.0. The precipitate was collected, washed with water, and recrystallized from dimethylformamide. The resulting acid, 4,5-dihydroxy-6,8-dimethyl-1,7-naphthyridine-3-carboxylic acid, melted at 295° C. with decomposition.

*Analysis.*—Calcd. for $C_{11}H_{10}N_2O_4$: C, 56.41; H, 4.30; N, 11.96. Found: C, 56.51; H, 4.42; N, 12.00.

In another run of this hydrolysis, 23.6 g. of ethyl 4,5-dihydro-6,8-dimethyl-1,7-naphthyridine-3-carboxylate and 150 cc. of 10% aqueous potassium hydroxide solution was heated on a steam bath for two hours, the reaction mixture made slightly acidic with hydrochloric acid, the solid collected and recrystallized from dimethyl formamide to yield 14.1 g. of 4,5-dihydroxy-6,8-dimethyl-1,7-naphthyridine-3-carboxylic acid, M.P. 285.0–286.0° C. (corr.) with decomposition.

*Analysis.*—Calcd. for $C_{11}H_{10}N_2O_4$: C, 56.41; H, 4.30; N, 11.96. Found: C, 56.67; H, 4.55; N, 12.21.

Example 26

(A) 8-acetoxymethyl - 3 - carbethoxy - 4 - hydroxy-6-methyl-1,7-naphthyridine-7-oxide.—To a solution containing 60.7 g. of ethyl 8-acetoxymethyl-4-hydroxy-6-methyl-1,7-naphthyridine-3-carboxylate in about 500 cc. of chloroform was added with stirring, in 50 cc. portions, a solution containing 46 g. of 3-chloroperbenzoic acid in about 400 cc. of chloroform. The reaction mixture was evaporated to a volume of about 150 cc.; about 1500 cc. of ether was added with stirring; and, the resulting yellow precipitate was collected, washed with ether, dried, and recrystallized from ethanol to yield 52.0 g. (81%) of 8-acetoxymethyl - 3 - carbethoxy-4-hydroxy-6-methyl-1,7-naphthyridine-7-oxide, M.P. 239–241° C.

(B) Ethyl 8-diacetoxymethyl)-4-hydroxy-6-methyl-1,7-naphthyridine-3-carboxylate.—A mixture containing 64 g. of 8-acetoxymethyl-3-carbethoxy-4-hydroxy-6-methyl-1,7-naphthyridine-7-oxide, 31 g. of acetic anhydride and 210 cc. of acetic acid was heated with stirring for seventeen and one-half hours on the steam bath. The reaction mixture was concentrated to dryness, the residue was triturated with ethyl acetate and filtered to remove a small amount of insoluble material. To the ethyl acetate filtrate (about 400 cc.) was added about two volumes of ether and the resulting mixture allowed to stand a few minutes and then filtered. The filtrate was concentrated to dryness; the residue was taken up in a small volume of tetrahydrofuran; about three to four volumes of ether was added; and the resulting solution was filtered through infusorial earth (Super-Cel). After some solid separated from the filtrate, more ether was added. The solid was collected and recrystallized once from isopropyl acetate and then from tetrahydrofuran-ether to yield 13.6 g. of ethyl 8-(diacetoxymethyl)-4-hydroxy-6-methyl-1,7-naphthyridine-3-carboxylate, M.P. 121.0–126.0° C. (corr.).

Analysis.—Calcd. for $C_{17}H_{18}N_2O_7$: C, 56.35; H, 5.01; N, 7.73. Found: C, 56.44; H, 5.03; N, 7.51.

(C) Ethyl 8-(diacetoxymethyl)-1,4-dihydro-4-oxo-6-methyl-1,7-naphthyridine-3-carboxylate is obtained following the procedure described in Example 21 using corresponding molar equivalent quantities of ethyl 8-(diacetoxymethyl-4-hydroxy-6-methyl-1,7-naphthyridine-3-carboxylate, dimethylformamide, anhydrous potassium carbonate and methyl iodide. Treating ethyl 8-(diacetoxymethyl)-1,4-dihydro-4-oxo-6-methyl-1,7-naphthyridine-3-carboxylate with hydrochloric acid following the procedure described in Example 27 yields 1,4-dihydro-1,6-dimethyl-8-formyl-4-oxo-1,7-naphthyridine-3-carboxylic acid.

Example 27

8-formyl-4-hydroxy-6-methyl-1,7-naphthyridine-3-carboxylic acid.—A mixture containing 10.2 g. of ethyl 8-(diacetoxymethyl)-4-hydroxy-6-methyl-1,7-naphthyridine-3-carboxylate, 16.6 cc. of 6 N hydrochloric acid and about 4 cc. of water was heated on a steam bath for fifteen minutes whereupon a solid separated. The reaction mixture was diluted with about 100 cc. of water; and the solid that separated was collected, washed with acetone, and dried to yield 5.5 g. of tan solid, M.P. >300° C. The aqueous filtrate was heated about one hour on a steam bath whereupon more solid separated; the solid was collected, washed successively with water and acetone to yield 0.5 g. of solid, M.P. >300° C. When a mixed melting point of the two solids showed no depression, they were combined and recrystallized from about 100 cc. of dimethylformamide. The recrystallized solid was triturated with ethanol, dried, and recrystallized from dimethylformamide to yield 3.3 g. of 8-formyl-4-hydroxy-6-methyl-1,7-naphthyridine-3-carboxylic acid, M.P. >300° C. (corr.).

Analysis.—Calcd. for $C_{11}H_8N_2O_4$: C, 56.90; H, 3.47; N, 12.07. Found: C, 56.76; H, 3.67; N, 12.14.

Example 28

(A) Ethyl 8-acetoxymethyl-1,4-dihydro-1,6-dimethyl-4-oxo-1,7-naphthyridine-3-carboxylate.—A mixture containing 33.1 g. of 3-carbethoxy-1,4-dihydro-4-oxo-1,6,8-trimethyl-1,7-naphthyridine-7-oxide, 150 cc. of acetic acid and 25 g. of acetic anhydride was heated with stirring on a steam bath for sixteen hours. The reaction mixture was concentrated to a volume of about 100 cc. and cooled. The solid that separated was collected, washed with ethyl acetate and dried to yield 28.6 g. of white solid. Recrystallization of the solid from about 800 cc. of acetonitrile yielded 26.0 g. of ethyl 8-acetoxymethyl-1,4-dihydro-1,6-dimethyl-4-oxo-1,7-naphthyridine-3-carboxylate, M.P. 214.8–215.8° C. (corr.). A mixed melting point with the product of Example 21 (prepared by reaction of methyl iodide with ethyl 8-acetoxymethyl-4-hydroxy-6-methyl-1,7-naphthyridine-3-carboylate) gave no depression; also the infrared spectra of the two products were found to be the same.

Analysis.—Calcd. for $C_{16}H_{18}N_2O_5$: C, 60.37; H, 5.70; N, 8.80. Found: C, 60.07; H, 5.74; N, 8.76.

Ethyl 8-acetoxymethyl-1,4-dihydro-1,6-dimethyl-4-oxo-1,7-naphthyridine-3-carboxylate was found to have in vivo activity against Staphylococcus aureus in mice when administered orally at 400 mg./kg./day (9 out of 10 mice survived) and subcutaneously at a dose level of 200 mg./kg./day (4 out of 10 mice survived).

(B) The above intermediate 3-carbethoxy-1,4-dihydro-4-oxo-1,6,8-trimethyl-1,7-naphthyridine-7-oxide was prepared as follows: 123 g. of ethyl 1,4-dihydro-4-oxo-1,6,8-trimethyl-1,7-naphthyridine-3-carboxylate was partially dissolved in 1300 cc. of chloroform at 50° C. To this mixture was added with stirring over a period of one hour a solution containing 200 g. of 3-chloroperbenzoic acid in 900 cc. of chloroform. During the addition period, the mildy exothermic reaction maintained the temperature of the reaction mixture at 45–60° C., complete dissolution resulting after fifteen minutes. The reaction mixture was concentrated to a volume of 1000 cc.; 3000 cc. of ether was added; and the resulting mixture was allowed to stand for one hour. The solid that separated was collected, triturated with ether, dried, and recrystallized once from water and twice from ethanol to yield 34.6 g. of 3-carbethoxy-1,4-dihydro-4-oxo-1,6,8-trimethyl-1,7-naphthyridine-7-oxide, M.P. 223.0–225.0° C. (corr.).

Analysis.—Calcd. for $C_{14}H_{16}N_2O_4$: C, 60.86; H, 5.89; N, 10.14. Found: C, 61.06; H, 5.94; N, 9.92.

3-carbethoxy-1,4-dihydro-4-oxo-1,6,8-trimethyl-1,7-naphthyridine-7-oxide was found to have in vivo activity against Staphylococcus aureus in mice when administered subcutaneously at a dose level of 200 mg./kg./day (5 out of 10 mice survived).

(C) Ethyl 1,4-dihydro-1,6-dimethyl-4-oxo-8-propionoxymethyl-1,7-naphthyridine-3-carboxylate is obtained following the procedure described in Example 28A using corresponding molar equivalent quantities of propionic anhydride and propionic acid in place of acetic anhydride and acetic acid, respectively.

(D) Ethyl 1,4-dihydro-1,6-dimethyl-8-formyloxymethyl-4-oxo-1,7-naphthyridine-3-carboxylate is obtained following the procedure described in Example 28A but using a mixture of acetic anhydride and an excess of formic acid (mixture reacts to form a mixed anhydride of formic and acetic acids, and acts as formylating agent) as the acylating agent.

(E) 8-acetoxymethyl-1,4-dihydro-1,6-dimethyl-4-oxo-1,7-naphthyridine is obtained following the procedure described in Example 28A using corresponding molar equivalent quantities of 1,4-dihydro-4-oxo-1,6,8-trimethyl-1,7-naphthyridine-1-oxide, acetic anhydride and acetic acid. The intermediate 1-oxide is obtained by reacting the 1,7-naphthyridine with 3-chloroperbenzoic acid as in Example 28B.

Example 29

(A) 3-carboxy-4-hydroxy-6,7,8-trimethyl-1,7-naphthyridinium hydroxide inner salt.—A mixture containing 45 g. of 3-carbethoxy-4-hydroxy-6,7,8-trimethyl-1,7-naphthyridinium iodide and 250 cc. of 10% aqueous potassium hydroxide solution was heated on a steam bath for thirty minutes, decolorizing charcoal added, and the hot mixture filtered. To the filtrate was added acetic acid until no further precipitation resulted; the mixture was cooled; and the precipitate was collected, recrystallized twice from water (using decolorizing charcoal the second time), and dried in a vacuum oven at 70° C. to yield 10 g. of 3-carboxy-4-hydroxy-6,7,8-trimethyl-1,7-naphthyridinium hydroxide inner salt, M.P. 320–321° C. with decomposition. On the basis of infrared spectral data and the following analysis, this product probably has the structure of Formula III where Z is COOH, $R_5$ is H, and $R_6$, $R_7$ and $R_8$ are each $CH_3$.

*Analysis.*—Calcd. for $C_{12}H_{12}N_2O_3$: C, 62.06; H, 5.21; N, 12.06. Found: C, 61.93; H, 5.21; N, 11.88.

(B) The above intermediate 3-carbethoxy-4-hydroxy-6,7,8-trimethyl-1,7-naphthyridinium iodide was prepared as follows: A mixture containing 49.2 g. of ethyl 6,8-dimethyl-4-hydroxy-1,7-naphthyridine - 3 - carboxylate, 50 cc. of methyl iodide and 500 cc. of dimethylformamide was heated on a steam bath with stirring for five hours. The reaction mixture was cooled and the precipitate collected to yield 11 g. of the methiodide. The filtrate was treated with two volumes of ether and the resulting precipitate collected to yield another 34 g. of 3-carbethoxy-4-hydroxy-6,7,8-trimethyl - 1,7 - naphthyridinium iodide.

(C) Following the procedure of Example 29B using a corresponding molar equivalent quantity of ethyl iodide, n-butyl bromide or allyl chloride in place of methyl iodide, there is obtained, respectively, 3-carbethoxy-6,8-dimethyl - 7 - ethyl-4-hydroxy-1,7-naphthyridinium iodide, 7 - n - butyl-3-carbethoxy-6,8-dimethyl-4-hydroxy-1,7-naphthyridinium bromide and 7-allyl-3-carbethoxy - 6,8-dimethyl-4-hydroxy-1,7-naphthyridinium chloride.

(D) Following the procedure of Example 29B using corresponding molar equivalent quantities of ethyl 4-hydroxy-6-methyl-1,7-naphthyridine - 3 - carboxylate in place of ethyl 6,8-dimethyl-4-hydroxy-1,7-naphthyridine-3-carboxylate and benzyl bromide, 4-chlorobenzyl chloride or 4-methoxybenzyl chloride in place of methyl iodide, there is obtained, respectively, 7-benzyl-3-carbethoxy - 4 - hydroxy-6-methyl-1,7-naphthyridinium bromide, 3-carbethoxy - 7 - (4-chlorobenzyl)-4-hydroxy-6-methyl-1,7-naphthyridinium chloride or 3-carbethoxy-4-hydroxy - 7 - (4-methoxybenzyl)-6-methyl-1,7-naphthyridinium chloride.

Example 30

3-carboxy - 7,8 - dimethyl-4-hydroxy-1,7-naphthyridinium hydroxide inner salt.—A mixture containing 33.5 g. of 3-carbethoxy - 7,8 - dimethyl-4-hydroxy-1,7-naphthyridinium iodide and 70 cc. of 6 N aqueous hydrochloric acid solution was heated with stirring on a steam bath for ninety minutes. Decolorizing charcoal and a little more water were added, and the mixture heated an additional fifteen minutes and filtered. The filtrate was placed in an ice bath and the solid that separated was collected. The solid was taken up in about 250 cc. of boiling water, the hot solution filtered to remove a small amount of insoluble material, and the filtrate allowed to cool. The crystalline precipitate that separated was collected to yield 19.5 g. (63%) of 3-carboxy-7,8-dimethyl-4-hydroxy-1,7-naphthyridinium iodide, M.P. 262° C. with decomposition. This product was dispersed in hot water, neutralized with 10% aqueous potassium bicarbonate solution, the hot solution treated with decolorizing charcoal and filtered, and the filtrate cooled in an ice bath. The resulting crystalline precipitate was collected, recrystallized once from about 175 cc. of water containing a little potassium bicarbonate, and recrystallized a second time from water and dried in a vacuum oven to yield 3.5 g. of 3-carboxy - 7,8 - dimethyl-4-hydroxy-1,7-naphthyridinium hydroxide inner salt, a greenish-yellow powder, M.P. 308° C. with decomposition. On the basis of infrared spectral data and the following analysis, this product probably has the structure of Formula III where Z is COOH, $R_5$ and $R_6$ are each H, and $R_7$ and $R_8$ are each $CH_3$.

*Analysis.*—Calcd. for $C_{11}H_{10}N_2O_3$: C, 60.54; H, 4.62; N, 12.84. Found: C, 60.61; H, 4.81; N, 13.01.

Example 31

3-carboxy - 1,4 - dihydro - 4 - oxo-1,6,7,8-tetramethyl-1,7-naphthyridinium hydroxide inner salt.—To a suspension of 20 g. of 3-carboxy-4-oxo - 1,6,7,8 - tetramethyl-1,7-naphthyridinium iodide in 25 cc. of cold water was added 4.5 cc. of 28% aqueous ammonia and the solution was filtered. About 300 cc. of acetone was added to the filtrate and the oily material that separated was triturated to induce solidification of the oil. The resulting yellow solid was collected, recrystallized once from water-acetone and twice from water, and dried for seventy hours at 78° C. in a vacuum oven to yield 7.2 g. of 3-carboxy-1,4-dihydro - 4 - oxo - 1,6,7,8 - tetramethyl - 1,7 - naphthyridinium hydroxide inner salt, an orange solid M.P. 210.0–211.0° C. (corr.) with decomposition. On the basis of infrared spectral data and the following analysis, this product probably has the structure of Formula IV where $R_5$ is H, and $R_1$, $R_6$, $R_7$ and $R_8$ are each $CH_3$.

*Analysis.*—Calcd. for $C_{13}H_{14}N_2O_3$: C, 63.40; H, 5.73; N, 11.38. Found: C, 62.68; H, 5.53; N, 10.91; $H_2O$, 0.9. Found (dry basis): C, 63.25; H, 5.48; N, 11.01.

Example 32

3-carboxy - 4,5 - dihydroxy - 6,7,8 - trimethyl-1,7-naphthyridinium hydroxide inner salt.—To a stirred solution of 12.1 g. of ethyl 4,5-dihydroxy-6,8-dimethyl-1,7-naphthyridine-3-carboxylate in 350 cc. of dimethylformamide heated on a steam bath was added 20.7 g. of anhydrous potassium carbonate and 9.3 cc. of methyl iodide. This reaction mixture was heated on a steam bath for four hours, the remaining solid filtered off and discarded, and the filtrate concentrated to dryness. The residue was triturated with water, dried, and recrystallized from ethanol to yield 4.5 g. of a light yellow solid (3-carbethoxy - 4,5 - dihydroxy - 6,7,8 - trimethyl-1,7-naphthyridinium iodide), M.P. 217–220° C. with decomposition. The solid was heated on a steam bath for one hour with 36 cc. of 5% aqueous potassium hydroxide solution; the resulting solution was neutralized with aqueous hydrochloric acid; and the solid that precipitated was collected, dried, and recrystallized from dimethylformamide to yield 1.4 g. of 3-carboxy-4,5-dihydroxy-6,7,8-trimethyl-1,7-naphthyridinium hydroxide inner salt, a yellow solid, M.P. 330° C. with decomposition. On the basis of infrared spectral data and the following analysis, this compound probably has the structure of Formula III where Z is COOH, $R_5$ is OH, and $R_6$, $R_7$ and $R_8$ are each $CH_3$.

*Analysis.*—Calcd. for $C_{12}H_{12}N_2O_4$: C, 58.06; H, 4.87; N, 11.29. Found: C, 58.35; H, 4.73; N, 11.21.

Example 33

The following reaction of 3-cyano-6,8-dimethyl-4-hydroxy-1,7-naphthyridine with methyl iodide yielded a mixture of 3-cyano-4-hydroxy-6,7,8-trimethyl-1,7 - naphthyridinium hydroxide inner salt (33A) and 3-cyano-1,4-dihydro-4-oxo-1,6,8-trimethyl-1,7-naphthyridine (33B).

(A) To a stirred solution of 32.8 g. of 3-cyano-6,8-dimethyl-4-hydroxy-1,7-naphthyridine in 250 cc. of dimethylformamide heated on a steam bath was added 23 g. of anhydrous potassium carbonate and then 12.4 cc. of methyl iodide, and the resulting reaction mixture was heated on a steam bath with stirring for two hours. The hot reaction mixture was filtered and the filtrate chilled to yield a green solid. [The solid was collected, recrystallized from 100 cc. of water, and set aside (see 33B).] The aqueous mother liquors from the reaction mixture were concentrated and the residue fractionally crystallized from dimethylformamide and from acetonitrile to yield 3.6 g. (10.3%) of 3-cyano-4-hydroxy-6,7,8-trimethyl-1,7-naphthyridinium hydroxide inner salt, a dark green solid, M.P. >300° C. with the decomposition. On the basis of infrared spectral data and the following analysis, this compound probably has the structure of Formula III where Z is CN, $R_5$ is H, and $R_6$, $R_7$ and $R_8$ are each $CH_3$.

*Analysis.*—Calcd. for $C_{12}H_{11}N_3O$: C, 67.59; H, 5.20; N, 19.71. Found: C, 67.47; H, 5.04; N, 19.59.

(B) The solid set aside in Example 33A was dissolved in water and the water solution washed repeatedly with chloroform. The chloroform washings were combined and concentrated by heating in vacuo on a steam bath. The concentrated chloroform solution was washed twice with water and further evaporated until a solid began to separate. The mixture was again transferred to a separatory funnel and again washed with water. Considerable further solid separated during this procedure. The solid was collected and recrystallized from dimethylformamide to yield 3.6 g. (10.3%) of 3-cyano-1,4-dihydro-4-oxo-1,6,8-trimethyl - 1,7 - naphthyridine, a white solid, M.P. 290.8–292.2° C. (corr.). Infrared spectral analysis showed this compound to have a strong carbonyl peak as well as a cyano peak.

*Analysis.*—Calcd. for $C_{12}H_{11}N_3O$: C, 67.59; H, 5.20; N, 19.71. Found: C, 67.58; H, 5.52; N, 19.67.

(C) The above intermediate 3-cyano-6,8-dimethyl-4-hydroxy-1,7-naphthyridine was prepared in two steps as follows: A mixture containing 122 g. of 3-amino-2,6-dimethylpyridine, 180 g. of ethyl ethoxymethylenecyanoacetate and 300 cc. of dimethylformamide was heated on a steam bath for about thirty minutes and then on a hot plate to dissolve completely the reactants and some product which had separated. The hot solution was allowed to cool to room temperature and the precipitated product was collected, washed and triturated with ethanol, and dried to yield 226 g. (92%) of ethyl N-(2,6-dimethyl-3 pyridyl)aminomethylenecyanoacetate, M.P. 198–199° C. A mixture of 61 g. of ethyl N-(2,6-dimethyl-3-pyridyl)aminomethylenecyanoacetate and 2500 cc. of diethyl phthalate was heated for three minutes at 287–290° C. and then for twelve minutes at 290° C. The hot reaction mixture was allowed to cool to room temperature with stirring and then divided into two portions. Each portion was diluted with three liters of n-hexane with stirring. The solids that separated from each were collected, combined, triturated with n-hexane, dried, and recrystallized successively from dimethylformamide, ethanol and dimethylformamide to yield 5.5 g. of 3-cyano-6,8-dimethyl-4-hydroxy-1,7 - naphthyridine, M.P. 298–300° C. with decomposition.

*Analysis.*—Calcd. for $C_{11}H_9N_3O$: C, 66.32; H, 4.55; N, 21.10. Found: C, 66.07; H, 4.51; N, 21.13.

Example 34

(A) 1,4 dihydro-1,6 - dimethyl - 8 - hydroxy - 4 - oxoquinoline-3-carboxylic acid from 3-carbethoxy-1,4-dihydro-4-oxo-1,6,7,8 - tetramethyl - 1,7 - naphthyridinium iodide. A mixture containing 0.7 g. of 3-carbethoxy-1,4-dihydro-4-oxo-1,6,7,8-tetramethyl - 1,7 - naphthyridinium iodide monohydrate, 2.0 cc. of 10% aqueous potassium hydroxide solution and 10 cc. of water was heated on a steam bath for about fifteen minutes whereupon solid started to separate. The reaction mixture was diluted to a volume of 25 cc. with water and heating was continued for an additional ninety minutes, at which time an additional 2.0 cc. of 10% potassium hydroxide solution was added to dissolve the precipitated solid. The solution was then heated an additional hour on a steam bath, filtered and to the filtrate was added hydrochloric acid to a pH of 3.5. The solid that separated was collected and recrystallized from about 10 cc. of dimethylformamide to yield 300 mg. of sparkling tan needles, M.P. 340° C. with decomposition after triturating successively with ethanol and ether. The compound also gave a negative test for halogen. The compound was dissolved in aqueous potassium hydroxide solution, filtered, and the filtrate was heated to its boiling point and acidified with acetic acid to a pH of 7. The solid was separated, washed successively with water and acetone and dried to yield the white solid product, 1,4-dihydro-1,6-dimethyl-8-hydroxy-4-oxoquinoline-3-carboxylic acid, M.P. 340–345° C. with decomposition, the structure of which was confirmed by its NMR and infrared spectral analyses, and the following analysis.

*Analysis.*—Calcd. for $C_{12}H_{11}NO_4$: C, 61.80; H, 4.75; N, 6.01. Found: C, 61.80; H, 4.83; N, 5.81.

(B) The intermediate 3-carbethoxy-1,4-dihydro-4-oxo-1,6,7,8-tetramethyl-1,7-naphthyridinium iodide was prepared as follows: A solution containing 5.6 g. of ethyl 1,4-dihydro-4-oxo-1,6,8-trimethyl - 1,7 - naphthyridine-3-carboxylate, 75 cc. of dimethylformamide and 6 cc. of methyl iodide was heated on a stead bath for sixteen hours, allowed to cool to room temperature, and filtered. The filtrate was concentrated and the residual liquid taken up in 100 cc. of ethanol. When cooling yielded a tarry material, the mixture was heated on a steam bath in vacuo to remove the ethanol. Water was added to the residual material and the mixture chilled. The tarry material that separated was filtered off by filtering the mixture through infusorial earth (Super-Cel.). The aqueous filtrate was concentrated to about 75 cc. and chilled; the light orange solid that separated was collected, recrystallized from ethanol and dried in a vacuum oven at 50° C. to yield 1.8 g. of 3 - carbethoxy - 1,4 - dihydro-4-oxo-1,6,7,8-tetramethyl-1,7-naphthyridinium iodide as its monohydrate.

*Analysis.*—Calcd. for $C_{15}H_{19}IN_2O_3$: N, 6.96; I, 31.55. Found: $H_2O$, 4.48; N, 6.43; I, 30.00. Found (dry basis): N, 6.73; I, 31.41.

(C) Following the procedure in Example 30 for the hydrolysis of 3 - carbethoxy - 7,8 - dimethyl - 4 - hydroxy-1,7 - naphthyridinium iodide with hydrochloric acid to the corresponding 3-carboxy compound, 3-carboxy-1,4-dihydro-4-oxo-1,6,7,8 - tetramethyl - 1,7-naphthyridinium iodide is obtained using corresponding molar equivalent quantities of 3-carbethoxy-1,4-dihydro-4-oxo-1,6,7,8-tetramethyl - 1,7 - naphthyridinium iodide monohydrate and hydrochloric acid.

(D) Following the procedure described in Example 34A using a molar equivalent quantity of 7-allyl-3-carbethoxy-1,4-dihydro-4-oxo-1,6,8-trimethyl - 1,7 - naphthyridinium bromide in place of 3-carbethoxy-1,4-dihydro-4-oxo-1,6,7,8-tetramethyl-1,7-naphthyridinium iodide, there is obtained the same product, 1,4-dihydro-1,6-dimethyl-8-hydroxy-4-oxoquinoline-3-carboxylic acid. The intermediate 7-allyl-3-carbethoxy-1,4-dihydro-4-oxo-1,6,8-trimethyl-1,7-naphthyridinium bromide is obtained following the procedure described in Example 34B using a molar equivalent quantity of allyl bromide in place of methyl iodide.

Example 35

1,4-dihydro-1,6-dimethyl-8-hydroxy-4-oxo-quinoline - 3-carboxylic acid from 3-carboxy-1,4-dihydro-4-oxo-1,6,7,8-tetramethyl-1,7-naphthyridinium iodide. To a solution containing 12.7 g. of 3-carboxy-1, 4-dihydro-4-oxo-1,6,7,8-tetramethyl-1,7-naphthyridinium iodide in 400 cc. of water was added 50 cc. of 10% aqueous potassium hydroxide solution. The resulting solution was heated on a steam bath for forty minutes and acidified with dyrochloric acid to a pH of 4. The resulting white precipitate was collected, washed successively with water and acetone, and dried to yield 7.2 g. of 1,4-dihydro-1,6-dimethyl-8-hydroxy-4-oxoquinoline-3-carboxylic acid, M.P. 340° C. with decomposition.

Example 36

4,8-dihydroxy-6-methylquinoline-3-carboxylic acid from 3 - carboxy-4-hydroxy-6,7,8-trimethyl-1,7-naphthyridinium hydroxide inner salt.—A solution containing 1.0 g. of 3-carboxy-4-hydroxy - 6,7,8 - trimethyl-1,7-naphthyridinium hydroxide inner salt and 6.5 cc. of 10% aqueous potassium hydroxide solution was heated on a steam bath under a reflux condenser for sixteen hours. The reaction mixture was diluted to a volume of about 80 cc. with water and the resulting solution acidified with 1 cc. of acetic acid. The solid that separated was collected, wash successively with water and acetone, and dried to yield 390 mg. of 4,8-dihydroxy-6-methyl-quinoline-3-carboxylic acid, M.P. 295° C. with decomposition.

*Analysis.*—Calcd. for $C_{11}H_9NO_4$: C, 60.27; H, 4.14; N, 6.39. Found: C, 59.99; H, 4.30; N, 7.09.

Example 37

(A) 4,8-dihydroxy-6,7 - dimethylquinoline-3-carboxylic acid from 3-carboxy-6,7-dimethyl-8-ethyl-4-hydroxy-1,7-naphthyridinium hydroxide inner salt. A solution containing 1.0 g. of 3-carboxy-6,7-dimethyl-8-ethyl-4-hydroxy-1,7-naphthyridinium hydroxide inner salt and 6.0 cc. of 10% aqueous potassium hydroxide solution was heated on a steam bath for two and one-half hours. The reaction mixture was diluted to a volume of about 40 cc. with water; 1 cc. of acetic acid was added to the hot solution; and, the solid that separated was collected and triturated twice with 100 cc. portions of hot water to remove any unreacted starting material. The solid was then recrystallized by dissolving it in hot dimethformamide and adding water to the boiling dimethylformamide solution to precipitate the product which was collected, washed successively with water and acetone, and dried in a vacuum oven at 60° C. to yield 4,8-dihydroxy-6,7-dimethylquinoline-3-carboxylic acid, M.P. 290° C with decomposition. Nuclear magnetic resonance spectral analysis of this compound showed two sharp methyl signals.

*Analysis.*—Calcd. for $C_{12}H_{11}NO_4$: C, 61.80; H, 4.75; N, 6.01. Found: C, 61.37; H, 4.84; N, 5.78.

(B) The above intermediate 3-carboxy-6,7-dimethyl-8-ethyl-4-hydroxy-1,7-naphthyridinium hydroxide inner salt was prepared by methylating the corresponding 3-carboxy - 4-hydroxy-6,7,8-trimethyl-1,7-naphthyridinium hydroxide inner salt, as follows: A mixture containing 7.0 g. of 3 - carboxy - 4-hydroxy-6,7,8-trimethyl-1,7-naphthyridinium hydroxide inner salt, 4.2 g. of anhydrous potassium carbonate and 80 cc. of dimethylformamide was heated with stirring on a steam bath for ten minutes. To this mixture was added 5 cc. of methyl iodide and the resulting reaction mixture was stirred on the steam bath for two hours and then filtered. The filtrate was chilled and the solid that separated was collected and washed with acetone. In case some methyl ester had been formed, the solid was dissolved in 125 cc. of hot water, 30 cc. of 10% aqueous potassium hydroxide solution was added, and the resulting mixture heated on a steam bath for three minutes (this amount of time is sufficient to hydrolyze any 3-carbomethoxy compound to the corresponding 3-carboxy compound without effecting any appreciable ring opening to form the 8-hydroxyquinoline shown above). The alkaline solution was acidified with acetic acid and chilled. The resulting precipitate was collected, washed with acetone, dried, recrystallized four times from dimethylformamide, triturated successively with water and ethanol at room temperature, and dried in vacuo at 65° C. to yield 3-carboxy-6,7-dimethyl-8-ethyl-4-hydroxy-1,7-naphthyridinium hydroxide inner salt, M.P. 309° C. with decomposition.

*Analysis.*—Calcd. for $C_{13}H_{14}N_2O_3$: C, 63.40; H, 5.73; N, 11.38. Found: C, 63.08; H, 5.60; N, 11.38.

(C) Following the procedure described in Example 37A using the appropriate 8-substituted-1,7-naphthyridinium salt, the following compounds are obtained: 4,8-dihydroxy - 7 - ethyl-6-methylquinoline-3-carboxylic acid using 3 - carboxy-6,7-dimethyl-4-hydroxy-8-n-propyl-1,7-naphthyridinium hydroxide inner salt (prepared as in Example 37B using ethyl iodide in place of methyl iodide), and 7 - benzyl - 8 - hydroxyquinoline using 7-methyl - 8 - (2 - phenylethyl)-1,7-naphthyridinium chloride (prepared as in Example 37B using 7,8-dimethyl-1,7-naphthyridinium chloride and benzyl chloride).

Example 38

(A) 4 - hydroxy - 6,7,8-trimethyl-1,7-naphthyridinium hydroxide inner salt is obtained following the procedure described in Example 29A using corresponding molar equivalent quantities of 4 - hydroxy-6,7,8-trimethyl-1,7-naphthyridinium iodide and aqueous potassium hydroxide solution. The intermediate 4-hydroxy-6,7,8-trimethyl-1,7-naphthyridinium iodide is obtained following the procedure described in Example 29B using corresponding molar equivalent quantities of 6,8-dimethyl-4-hydroxy-1,7 - naphthyridine and methyl iodide, 6,8 - dimethyl-4-hydroxy-1,7-naphthyridine is obtained by decarboxylating 6,8 - dimethyl-4-hydroxy-1,7-naphthyridine-3-carboxylic acid by heating the acid in an oil bath at about 300° C. for about ten minutes.

(B) Following the procedure described in Example 36 using corresponding molar equivalent quantities of 4-hydroxy - 6,7,8 - trimethyl-1,7-naphthyridinium hydroxide inner salt and aqueous potassium hydroxide solution, 4,8-dihydroxy-6-methylquinoline is obtained.

(C) Following the procedure described in Example 35 using corresponding molar equivalent quantities of 4-hydroxy - 6,7,8 - trimethyl-1,7-naphthyridinium iodide and aqueous potassium hydroxide solution, 4,8 - dihydroxy-6-methylquinoline is obtained.

Example 39

(A) 1,4 - dihydro - 4 - oxo-1,6,7,8-tetramethyl-1,7-naphthyridinium hydroxide inner salt is obtained following the procedure described in Example 31 using corresponding molar equivalent quantities of 1,4-dihydro-4-oxo - 1,6,7,8 - tetramethyl-1,7-naphthyridinium iodide and aqueous ammonia. The intermediate 1,4-dihydro-4-oxo-1,6,7,8 - tetramethyl-1,7-naphthyridinium iodide is obtained following the procedure described in Example 29B using corresponding molar equivalent quantities of 1,4-dihydro - 4 - oxo-1,6,8-trimethyl-1,7-naphthyridine and methyl iodide. 1,4 - dihydro - 4 - oxo-1,6,8-triethyl-1,7-naphthyridine was obtained as follows: 9.3 g. of 1,4-dihydro - 4 - oxo - 1,6,8-trimethyl-1,7-naphthyridine-3-carboxylic acid was heated in an oil bath at 285-310° C. for ten minutes. The reaction mixture was cooled and taken up in about 40 cc. of chloroform. The chloroform solution was treated with decolorizing charcoal (no apparent effect) and filtered. The filtrate was evaporated to about two-thirds of its original volume, and ether added to the hot solution until crystallization started. The mixture was cooled; the precipitate was collected and recrystallized successively from acetone and acetonitrile to yield 3.3 g. of 1,4 - dihydro-4-oxo-1,6,8-trimethyl-1,7-naphthyridine, M.P. 168.0–170.8° C. (corr.).

*Analysis.*—Calcd. for $C_{11}H_{12}N_2O$: C, 70.20; H, 6.43; N, 14.89. Found: C, 70.32; H, 6.52; N, 14.67.

(B) Following the procedure described in Example 37A using corresponding molar equivalent quantities of 1,4 - dihydro-4-oxo-1,6,7,8-tetramethyl-1,7-naphthyridinium hydroxide inner salt and aqueous potassium hydroxide solution, 1,4 - dihydro-1,6-dimethyl-8-hydroxy-4-oxoquinoline is obtained.

(C) Following the procedure described in Example 35 using corresponding molar equivalent quantities of 1,4-dihydro - 4 - oxo-1,6,7,8-tetramethyl-1,7-naphthyridinium iodide and aqueous potassium hydroxide solution, 1,4-dihydro-1,6-dimethyl-8-hydroxy-4-oxoquinoline is obtained.

Example 40

(A) Ethyl 8-(α-acetoxyethyl)-6-ethyl-4 - hydroxy-1,7-naphthyridine-3-carboxylate is obtained following the procedure described in Example 25A using corresponding molar equivalent quantities of 3-carbethoxy-6,8-diethyl-4-hydroxy-1,7-naphthyridine-7-oxide, acetic anhydride and acetic acid. The intermediate 7-oxide is prepared following the procedure of Example 19 (for the preparation of the intermediate 3 - carbethoxy-4-hydroxy-6-methyl-1,7-naphthyridine-7-oxide) using corresponding molar equivalent quantities of ethyl 6,8-diethyl-4-hydroxy-1,7-naphthyridine-3-carboxylate and peracetic acid.

(B) Ethyl 8-(α,α-diacetoxyethyl)-6-ethyl-4-hydroxy-1,7-naphthyridine-3-carboxylate is obtained following the procedure described in Example 26B using corresponding molar equivalent quantities of 8-(α-acetoxyethyl)-3-carbethoxy-6-ethyl-4-hydroxy-1,7-naphthyridine-7-oxide, acetic anhydride and acetic acid. The intermediate 7-oxide is prepared following the procedure of Example 26A using corresponding molar equivalent quantities of ethyl 8-(α-acetoxyethyl) - 6 - ethyl - 4-hydroxy-1,7-naphthyridine-3-carboxylate and 3-chloroperbenzoic acid.

(C) 8-acetyl - 6 - ethyl-4-hydroxy-1,7-naphthyridine-3-carboxylic acid is obtained following the procedure described in Example 27 using corresponding molar equivalent quantities of ethyl 8-(α,α-diacetoxyethyl)-6-ethyl-4-hydroxy-1,7-naphthyridine-3-carboxylate and hydrochloric acid. The corresponding ethyl ester is obtained by heating the acid and ethyl iodide in dimethylformamide in the presence of anhydrous potassium carbonate.

(D) Ethyl 8-acetyl - 1,4 - dihydro-6-ethyl-4-oxo-1,7-naphthyridine-3-carboxylate is obtained following the procedure described in Example 1 using corresponding molar equivalent quantities of ethyl 8-acetyl-6-ethyl-4-hydroxy-1,7-naphthyridine-3-carboxylate, methyl iodide, dimethylformamide and anhydrous potassium carbonate. Alkaline hydrolysis, as in Example 2, yields the corresponding acid.

Other lower-alkyl 1,4 - dihydro - 8-(lower-alkanoyl)-1-(lower-alkyl) - 4 - oxo-1,7-naphthyridine-3-carboxylates, and acids, can be obtained following the series of steps shown above in Examples 40A through 40D, starting with the appropriate corresponding 4-hydroxy - 3 - (lower-carbalkoxy)-8-(lower-alkyl)-1,7-naphthyridine-7-oxide, e.g., methyl 1,4-dihydro-1-methyl-4-oxo-8-propionyl-1,7-naphthyridine-3-carboxylate, starting with 3-(carbomethoxy)-4-hydroxy - 8 - n-propyl-1,7-naphthyridine-7-oxide.

Example 41

(A) Ethyl 8 - acetamido - 1,4-dihydro-1,6-dimethyl-4-oxo-1,7-naphthyridine-3-carboxylate is obtained following the procedure described in Example 7 using corresponding molar equivalent quantities of ethyl 8-acetamido-4-hydroxy - 6-methyl-1,7-naphthyridine-3-carboxylate, methyl iodide, dimethylformamide and anhydrous potassium carbonate. The intermediate 4-hydroxy compound is obtained following the procedures described in Example 1 by reacting 2-acetamido-3-amino - 6-methylpyridine with diethyl ethoxymethylene-malonate to form diethyl N-(2-acetamido - 6 - methyl-3-pyridyl)aminomethylenemalonate, M.P. 170.0–171.4° C. (corr.), cyclizing the malonate by heating in Dowtherm A to form ethyl 8-acetamido-4-hydroxy - 6 - methyl-1,7-naphthyridine-3-carboxylate. 2-acetamido-3-amino-6-methyl-pyridine is obtained in two steps by reacting 2-amino-6-methyl-3-nitropyridine with acetic anhydride in acetic acid to obtain 2-acetamido-6-methyl - 3-nitropyridine, M.P. 148.2–150.0° C. (corr.), which is then hydrogenated in ethanol using palladium-on-charcoal as catalyst.

(B) 8 - amino - 1,4 - dihydro-1,6-dimethyl-4-oxo-1,7-naphthyridine-3-carboxylic acid is obtained following the procedure described in Example 8 using corresponding molar equivalent quantities of ethyl 8-acetamido-1,4-dihydro - 1,6 - dimethyl - 4 - oxo-1,7-naphthyridine-3-carboxylate, aqueous potassium hydroxide solution and water.

(C) 1,4 - dihydro-1,6 - dimethyl-8-hydroxy-4-oxo-1,7-naphthyridine-3-carboxylic acid is obtained following the procedure described in Example 9 using a corresponding molar equivalent quantity of 8-amino-1,4-dihydro-1,6-dimethyl-4-oxo-1,7-naphthyridine-3-carboxylic acid in place of 6-amino - 1,4 - dihydro-1,8-dimethyl-4-oxo-1,7-naphthyridine-3-carboxylic acid.

Example 42

8 - amino - 1,4-dihydro-1,5-dimethyl-4-oxo-1,7-naphthyridine-3-carboxylic acid and 1,4-dihydro-1,5-dimethyl-8-hydroxy-4-oxo-1,7-naphthyridine-3-carboxylic acid are obtained following the procedures of Examples 41A, 41B and 41C starting with diethyl N-(2-acetamido-5-methyl-3-pyridyl)aminomethylenemalonate, M.P. 151.4–152.8° C. (corr.), in place of diethyl N-(2-acetamido-6-methyl-3-pyridyl)aminomethylenemalonate.

Example 43

(A) Ethyl 1-n - butyl-1,4-dihydro-6,8-diethyl-1,7-naphthyridine-3-carboxylate is obtained following the procedure described in Example 1 using a molar equivalent quantity of n-butyl iodide in place of methyl iodide.

(B) 1-n-butyl-1,4-dihydro-6,8-diethyl - 1,7 - naphthyridine-3-carboxylic acid is obtained following the procedure described in Example 2 using a molar equivalent quantity of the ester of Example 43A in place of ethyl 1,4-dihydro-4-oxo-1,6,8-trimethyl-1,7-naphthyridine-3-carboxylate.

Example 44

(A) Ethyl 1,4 - dihydro-6,8-diethyl-1-n-hexyl-1,7-naphthyridine-3-carboxylate is obtained following the procedure described in Example 1 using a molar equivalent quantity of n-hexyl iodide in place of methyl iodide.

(B) 1,4-dihydro-6,8-diethyl-1-n-hexyl - 1,7 - naphthyridine-3-carboxylic acid is obtained following the procedure described in Example 2 using a molar equivalent quantity of the ester of Example 44A in place of ethyl 1,4-dihydro-4-oxo-1,6,8-trimethyl-1,7-naphthyridine-3-carboxylate.

As noted hereinabove, it is understood that the one composition aspect of the invention broadly comprehends 1 - (lower - alkyl) - 3 - Z - 1,4 - dihydro - 4 - oxo - 1,7-naphthyridines where Z is carboxy and any group convertible to carboxy by hydrolysis, whether by acid or alkaline hydrolysis. By way of illustration, without limiting the foregoing, the following additional 1,4-dihydro-4-oxo-1,6,8-trimethyl-3-Z-1,7-naphthyridines and their mode of preparation are presented as follows, where "nap" stands for 1,4 - dihydro - 4 - oxo - 1,6,8 - trimethyl - 1,7-naphthyridine: nap-3-COO-n-hexyl, by reaction of nap-3-COOCH$_3$ with n-hexanol in the presence of NaOCH$_3$ as catalyst; nap - 3 - COO - n - decyl, by reaction of nap-3-COOC$_2$H$_5$ with n-decanol in the presence of NaOCH$_3$ as catalyst; nap-COO-(4-methoxyphenyl), by reaction of nap-3-COCl with sodium 4-methoxyphenoxide;

by reaction of nap-3-COOCH$_3$ with

HOCH$_2$CH$_2$N(C$_2$H$_5$)$_2$ in the presence of NaOCH$_3$ as catalyst;

nap-3-COOCH$_2$CH$_2$CH$_2$NHC$_4$H$_9$-n by reaction of nap-3-COOCH$_3$ with

HOCH$_2$CH$_2$CH$_2$NHC$_4$H$_9$-n in the presence of NaOCH$_3$ as catalyst; nap-3-COSC$_2$H$_5$, by reaction of nap-3-COCl with HSC$_2$H$_5$; nap-3-COS-(4-chlorophenyl), by reaction of nap-3-COCl with sodium 4-chlorophenyl mercaptide; nap-3-COSCH$_2$CH$_2$N(CH$_3$)$_2$, by reaction of nap-3-COCl with HSCH$_2$CH$_2$N(CH$_3$)$_2$; nap-3-CONHC$_3$H$_7$-n, by reaction of nap-3-COCl with n-propylamine; nap-3-CON(C$_2$H$_5$)$_2$, by reaction of nap-3-COCl with diethylamine; nap-3-CONHCH$_2$CH$_2$-piperidino, by reaction of nap-3-COCl or nap-3-COOCH$_3$ with 2-piperidinoethylamine; nap-3-CONHCH$_2$CH$_2$OH, by reaction of nap-3-COCl with NH$_2$CH$_2$CH$_2$OH;

nap-3-CONHCH$_2$CH$_2$COOCH$_3$ by reaction of nap-3-COCl with NH$_2$CH$_2$CH$_2$COOCH$_3$; nap-3-CONHCH$_2$CH$_2$COOH, by reaction of nap-3-COCl with NH$_2$CH$_2$CH$_2$COOH; nap-3-CONHNH$_2$, by reaction of nap-3-COOC$_2$H$_5$ with NH$_2$NH$_2$; nap-3-CONHN(CH$_3$)$_2$, by reaction of nap-3-COCl with NH$_2$N(CH$_3$)$_2$;

nap-3-CON(C$_6$H$_5$)N(CH$_3$)$_2$ by reaction of nap-3-COCl with HN(C$_6$H$_5$)N(C$_2$H$_5$)$_2$ where C$_6$H$_5$ is unsubstituted-phenyl;

nap-3-C(=NH.HCl)OC$_2$H$_5$ by reaction of nap-3-CN with C$_2$H$_5$OH and HCl; nap-3-C(=NH.HCl)NH$_2$, by reaction of nap-3-C(=NH.HCl)OC$_2$H$_5$ with ammonia; nap-3-C(=NH)NHC₂H₅, by reaction of nap-3-C(=NH.HCl)OC₂H₅ with C₂H₅NH₂;

nap-3-C(=O)SH

[same as nap-3-C(=S)OH], by reaction of nap-3-COCl with KSH and acidification of resulting nap-3-C(=O)SK with HCl; nap-3-COONa, by reaction of nap-3-COOH with NaOH; nap-3-COO.Ca/2, by reaction of nap-3-COOH with Ca(OH)₂; nap-3-COOH-diethanolamine salt by reaction of nap-3-COOH with diethanolamine; nap-3-COOH-N-methylglucamine salt, by reaction of nap-3-COOH with N-methylglucamine. All of the above 1,4-dihydro - 4 - oxo - 1,6,8 - trimethyl - 3 - Z - 1,7 - naphthyridines can be hydrolyzed to 1,4-dihydro-4-oxo-1,6,8-trimethyl-1,7-naphthyridine-3-carboxylic acid by reacting each with an aqueous mineral acid, e.g., hydrochloric acid, the reaction preferably being carried out by heating and, where needed, using a suitable solvent, e.g., acetic acid.

The subject matter which the applicant regards as his invention is particularly pointed out and distinctly claimed as follows:

1. 1 - (lower - alkyl) - 3 - Z - 1,4 - dihydro - 4 - oxo-1,7-naphthyridines where Z is a member of the group consisting of carboxy and groups convertible to carboxy by hydrolysis.

2. A compound of the formula

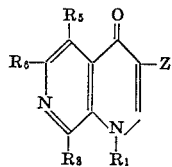

where Z is selected from the group consisting of carboxy, lower-carbalkoxy, carbamyl and cyano; R₁ is lower-alkyl; R₅ is a member of the group consisting of hydrogen and lower-alkyl; R₆ is a member of the group consisting of hydrogen, lower-alkyl, lower-alkoxy, hydroxy, amino and lower-alkanoylamino; and, R₈ is a member of the group consisting of hydrogen, lower-alkyl, lower-alkoxy, hydroxy, amino, lower-alkanoylamino, lower-alkanoyl, hydroxymethyl, lower-alkanoyloxymethyl and di-(lower-alkanoyloxy)methyl.

3. A compound of the formula

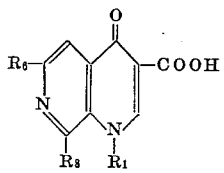

where R₁, R₆ and R₈ are each lower-alkyl.

4. A compound of the formula

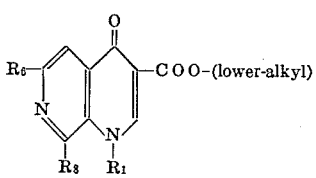

where R₁, R₆ and R₈ each are lower-alkyl.

5. 1,4 - dihydro - 4 - oxo - 1,6,8 - trimethyl - 1,7-naphthyridine-3-carboxylic acid.

6. Ethyl - 1,4 - dihydro - 4 - oxo - 1,6,8 - trimethyl - 1,7-naphthyridine-3-carboxylate.

7. 6 - amino - 1,4 - dihydro - 1,8 - dimethyl - 4 - oxo-1,7-naphthyridine-3-carboxylic acid.

8. 1,4 - dihydro - 1,8 - dimethyl - 6 - hydroxy - 4 - oxo-1,7-naphthyridine-3-carboxylic acid.

9. 1,4 - dihydro - 1,6 - dimethyl - 4 - oxo - 1,7 - naphthyridine-3-carboxylic acid.

10. 1,4 - dihydro - 1,8 - dimethyl - 4 - oxo - 1,7 - naphthyridine-3-carboxylic acid.

11. 1,4 - dihydro - 1,6 - dimethyl - 8 - hydroxymethyl-4-oxo-1,7-naphthyridine-3-carboxylic acid.

12. Ethyl 8 - acetoxymethyl - 1,4 - dihydro - 1,6 - dimethyl-4-oxo-1,7-naphthyridine-3-carboxylate.

13. 1,4,5,6,7,8 - hexahydro - 4 - oxo - 1,6,8 - trimethyl-1,7-naphthyridine-3-carboxylic acid.

14. 7 - benzyl - 1,4,5,6,7,8 - hexahydro-4-oxo-1,6,8-trimethyl-1,7-naphthyridine-3-carboxylic acid.

15. 3 - cyano - 1,4 - dihydro-1,6,8-trimethyl-4-oxo-1,7-naphthyridine.

16. 8-(lower-alkyl)-7-R₇-1,7-naphthyridinium quaternary salt where R₇ is a member selected from the group consisting of lower-alkyl and lower-alkenyl.

17. 7,8-di-(lower-alkyl)-1,7-naphthyridinium quaternary salt.

18. 3 - carboxy - 7,8 - di - (lower-alkyl)-4-hydroxy-1,7-naphthyridinium quaternary salt.

19. 3 - carboxy - 1,4 - dihydro - 4-oxo-1,7,8-tri-(lower-alkyl)-1,7-naphthyridinium quaternary salt.

20. 4-hydroxy-7-(lower-alkyl)-1,7-naphthyridinium hydroxide inner quaternary salt.

21. A compound of the formula

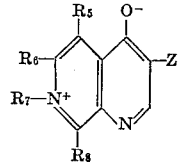

where Z is selected from the group consisting of hydrogen, carboxy and cyano; R₅ is a member of the group consisting of hydrogen, hydroxy and lower-alkyl; R₆ is a member of the group consisting of hydrogen and lower-alkyl; and, R₇ and R₈ are each lower-alkyl.

22. 3 - carboxy-4-hydroxy-6,7,8-trimethyl-1,7-naphthyridinium hydroxide inner salt.

23. 3 - carboxy - 7,8 - dimethyl-4-hydroxy-1,7-naphthyridinium hydroxide inner salt.

24. 3 - cyano - 4 - hydroxy - 6,7,8 - trimethyl - 1,7-naphthyridinium hydroxide inner salt.

25. 3 - carboxy-4,5-dihydroxy-6,7,8-trimethyl-1,7-naphthyridinium hydroxide inner salt.

26. 3 - carboxy-1,4-dihydro-1,7-di-(lower-alkyl)-4-oxo-1,7-naphthyridinium hydroxide inner salt.

27. A compound of the formula

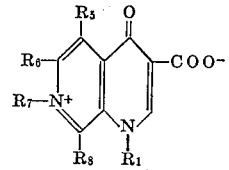

where R₅ is selected from the group consisting of hydrogen and lower-alkyl; R₆ is a member of the group of hydrogen and lower-alkyl; and R₁, R₇ and R₈ are each lower-alkyl.

28. 3 - carboxy - 1,4-dihydro-1,6,7,8-tetramethyl-4-oxo-1,7-naphthyridinium hydroxide inner salt.

29. Lower alkyl 6,8 - di - (lower-alkyl)-4-hydroxy-1,7-naphthyridine-3-carboxylate.

30. Ethyl 6,8-dimethyl-4-hydroxy-1,7-naphthyridine-3-carboxylate.

31. Ethyl 6 - ethyl - 4-hydroxy-8-methyl-1,7-naphthyridine-3-carboxylate.

32. Lower-alkyl 8 - (lower - alkyl)-4-hydroxy-1,7-naphthyridine-3-carboxylate.

33. Ethyl 4-hydroxy-8-methyl-1,7-naphthyridine-3-carboxylate.

34. 3-Z-4-hydroxy-8-R₈-1,7-naphthyridines where Z is a member of the group consisting of carboxy and lower-carbalkoxy, and R₈ is a member of the group consisting of hydroxymethyl, lower-alkanolyoxymethyl, di-(lower-alkanoyl-oxy)methyl and formyl.

35. Ethyl 8 - acetoxymethyl - 4 - hydroxy-6-methyl-1,7-naphthyridine-3-carboxylate.

36. Ethyl 8 - (diacetoxymethyl) - 4 - hydroxy-6-methyl-1,7-naphthyridine-3-carboxylate.

37. 8 - formyl-4-hydroxy-6-methyl-1,7-naphthyridine-3-carboxylic acid.

References Cited

UNITED STATES PATENTS

| | | | |
|---|---|---|---|
| 2,518,130 | 8/1950 | Evans et al. | 260—250 |
| 3,149,104 | 9/1964 | Lesher et al. | 260—240 |

OTHER REFERENCES

Murray et al., J. Org. Chem., vol. 19, pp. 2008–14 (1954) QD 241 J.6.

Hauser et al., Chem. Abstracts, vol. 52, par. 9105 (1958).

Dornow et al., Chem. Abstracts, vol. 52, par. 2015 (1958).

Harris et al., J. Am. Chem. Soc., vol. 73, pp. 3959–63 (1951) QD1.A5.

Fieser and Fieser, Advanced Organic Chem., Reinhold (1961) pp. 407, 800 QD251 F5aC.4.

Klingsberg, Pyridine and Derivatives, part 2 Interscience (1961) pp. 125–6 QD 401 KC.2.

Fieser et al., Organic Chemistry, Heath 3d ed. (1958) p. 228.

Culvenor, Reviews of Pure and Applied Chemistry, vol. 3 (1953), pp. 83–87.

HENRY R. JILES, *Primary Examiner.*

A. L. ROTMAN, *Assistant Examiner.*

U.S. Cl. X.R.

260—295, 240, 287, 289, 294.8; 424—256

PO-1050
(5/69)

UNITED STATES PATENT OFFICE
CERTIFICATE OF CORRECTION

Patent No. 3,429,887                    Dated February 25, 1969

Inventor(s) George Y. Lesher

It is certified that error appears in the above-identified patent and that said Letters Patent are hereby corrected as shown below:

Column 3, line 38, "iodine" should read --iodide--. Column 5, line 1, "-hydroxyl-" should read -- -hydroxy- --; line 16, "-5," should read -- -5- --. Column 7, line 28, "amino," should read -- amino- --. Column 8, line 19, "naphthyridine,-" should read -- naphthyridine- --. Column 12, Table B, line No. 7, "93" should read --83--. Column 13, line 43, "263.2°C" should read --263.8°C--. Column 19, line 12, "desrribed" should read --described--. Column 23, line 1, "8-diacetoxymethyl)" should read --8-(diacetoxymethyl)--. Column 25, line 3, "H." should read --$H_4$--. Column 28, line 6, "stead" should read --steam--; line 52 "dyrochloric" should read --hydrochloric--. Column 29, line 14, "dimethformamide" should read --dimethylformamide--. Column 30, line 3, "iodide," should read --iodide.--; line 30, "triethyl" should read --trimethyl--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents